(12) United States Patent
    Christensen

(10) Patent No.: US 8,824,903 B2
(45) Date of Patent: Sep. 2, 2014

(54) OPTICAL RECEIVER/TRANSMITTER WITH CIRCUIT FOR DETERMINING MODULATION AMPLITUDE

(75) Inventor: Steen Bak Christensen, Roskilde (DK)

(73) Assignee: Mellanox Technologies Denmark APS, Roskilde (DK)

(*) Notice: Subject to any disclaimer, the term of this patent is extended or adjusted under 35 U.S.C. 154(b) by 245 days.

(21) Appl. No.: 13/547,785

(22) Filed: Jul. 12, 2012

(65) Prior Publication Data
    US 2013/0016965 A1    Jan. 17, 2013

Related U.S. Application Data

(60) Provisional application No. 61/506,842, filed on Jul. 12, 2011.

(51) Int. Cl.
    *H04B 10/50*    (2013.01)
    *H04B 10/69*    (2013.01)
    *H04B 10/077*   (2013.01)
    *H04B 10/073*   (2013.01)

(52) U.S. Cl.
    CPC ........ *H04B 10/0779* (2013.01); *H04B 10/0731* (2013.01)
    USPC .......................................... 398/209; 398/197

(58) Field of Classification Search
    USPC .................................................. 398/197, 209
    See application file for complete search history.

(56) References Cited

U.S. PATENT DOCUMENTS

| 5,371,763 A | 12/1994 | Ota et al. |
| 2011/0020006 A1 | 1/2011 | Christensen |
| 2012/0027400 A1 | 2/2012 | Christensen |
| 2012/0106953 A1* | 5/2012 | Nguyen et al. ................. 398/38 |

* cited by examiner

*Primary Examiner* — Leslie Pascal
(74) *Attorney, Agent, or Firm* — Buchanan Ingersoll & Rooney PC

(57) ABSTRACT

A method for an optical transmitter, receiver or transceiver allowing determination of a signal property of a first binary signal such as the modulation amplitude. The method applies a reference stage which is modulated by the signal content of the first binary signal to allow the determination.

20 Claims, 14 Drawing Sheets

OPTICAL RECEIVER/TRANSMITTER WITH CIRCUIT FOR DETERMINING MODULATION AMPLITUDE

TECHNICAL FIELD

The invention relates to a method and circuit for an optical receiver, transmitter or transceiver.

BACKGROUND ART

The demands for ever-increasing bandwidths in digital data communication equipment at reduced power consumption values are constantly growing. These demands not only require more efficient integrated-circuit components, but also higher performances, interconnect structures and devices. Indeed, as one example, the International Technology Roadmap for Semiconductors (ITRS) projects that high performance chips in the very near future will have operating frequencies, both on-chip and off-chip, rising above 50 GHz. Conventional metal-wire based interconnects have played a central role in the microelectronics revolution. It is apparent that wire-based interconnect devices will be challenged to enabling even higher operating frequencies.

However, besides challenges with regard to bandwidth, the wire-based interconnect of the future may struggle significantly with a high power consumption. The power requirement of electronic components typically increases with increased bandwidth, which in some cases results in increased cooling requirements which further increases the power consumption of the electronic system as a whole. The power and cooling requirement may be particularly challenging to meet in data centers where larger quantities of servers are pooled often closely spaced. Such pooling inherently requires large quantities of interconnects which therefore may add significantly to the power and cooling requirements of the datacenter.

One approach to solve this problem includes utilizing optical interconnects as an alternative to wire-based interconnections, as optical fibers have a significantly higher bandwidth relative to an electrical wire. In one embodiment it is therefore an object of the present invention to provide means for reducing the power requirement of an optical interconnect.

An optical interconnect is typically composed by a transceiver module in each end adapted to transmit optical information along one or two optical fibers. The transmitter of each transceiver typically comprises a driver circuit coupled to a light source and a receiver circuit coupled to a photo detector. Typically optical fibers are used as transmission medium in which case the light source and photo detector will be coupled to fibers. A driver circuit (often located on a driver chip) is a circuit tailored to generate a waveform appropriate to drive a light emitting device in response to an input signal which is typically a binary data stream. The combination of a driver circuit and a light source is referred to as a transmitter. A receiver circuit (often located on a receiver chip) is a circuit tailored to receive the output from the light detector and generate a corresponding binary data stream. The combination of a receiver circuit and a photo detector is referred to as a receiver. Often the receivers and transmitters provide multiple channels, i.e. the ability to transmit or receive via multiple light sources or photo detectors. Sometimes driver and receiver circuits are combined on the same chip which is then referred to as a transceiver chip. Besides driver, receiver and/or transceiver chips optical modules may comprise further chips and electronics such as e.g. a microcontroller. Typically, the binary signal used in such optical links is an amplitude modulated NRZ signal but other signal types are in principle possible.

In a typical optical interconnect Vertical Cavity Surface Emitting Laser (VCSEL) diodes are utilized as light emitter to transmit binary data over optical fibers. However, the light source may in principle be any suitable light source and the transmitted waveform may be any suitable waveform for transmitting information. Most light emitters have a threshold current above which they substantially begin to emit light. Increasing the current driven through the emitter from zero to above said threshold may be time consuming, and therefore a bias current is typically driven through the light source. Often the bias current is set just below, at the threshold or above the threshold, but it may also be set to be well above threshold. This bias current is often programmable so as the same circuit design may be utilized to drive different light emitters and/or be used for different applications. Additional time varying current which modulates the emission from the light emitter is referred to as the modulation current.

For a VCSEL the suitable modulation and bias current levels change with temperature and age so the driver is often programmed with VCSEL characteristics that describe the performance as a function of temperature. The actual operation of the driver is then often determined by the temperature and the programmed levels.

To ensure stable operation it is often necessary to characterize each VCSEL individually, or if the uniformity from VCSEL to VCSEL is sufficiently good it is necessary to characterize the VCSEL on a batch level to determine suitable bias and modulation currents. One of the main problems with the manufacturing of VCSEL is that the uniformity from batch to batch may be poor and therefore it may not be possible to use the same programming for all VCSEL's. In addition, the bias and modulation currents change with the age of the VCSEL, but most systems do not have a method for compensating for aging of the VCSEL. Some systems overcome this by a build in timer adding further complexity to the system. Again aging may not be well characterized for VCSEL's and may have large batch to batch variations. This also means that it may not be possible to have a reliable end of life warning, at least not without a large safety margin.

As outlined above, the response of a light source in the transmitter, such as a VCSEL, may vary due to factors such as temperature, aging and production variations. It may therefore be valuable to monitor the optical signal received and/or transmitted for example to monitor the quality of the signal to allow prediction of a bit error rate. While it is relatively straight forward to measure the average optical power it is often more challenging to determine the modulation amplitude. One method is to apply one or more peak detector(s) to determine at least one of the logic levels of the binary signal i.e. the low level and/or the high level. By knowledge of either or both logic levels or one logic level and the signal average, the modulation amplitude of the signal and/or the extinction ratio may be determined. A measure of the logic levels may also be applied to set the decision threshold level for a receiver such as in U.S. Pat. No. 5,371,763 where peak detectors are applied to determine the logic-low level and logic-high level from the preamble in a burst mode communication system. However, the inventors have found that the response time of a peak detector circuit is often related to the power consumption of said circuit so that the power consumption of such a circuit can be relatively high due to high communication speeds current implemented and expected in the future. The inventors has also identified that the response time must often be chosen carefully to ensure a useful measurement.

Too fast and the peak detector may determine the peak height of sub features in the signal such as peaking during transitions between low and high. Too slow and the measure peak level may be incorrect due to averaging. Hence alternative methods of determining the amplitude of a binary signal in an optical transmitter and/or receiver is needed.

DISCLOSURE OF INVENTION

In one embodiment the invention relates to a method of determining signal property of a first binary signal in a circuit for an optical transmitter, receiver or transceiver comprising
  a. providing a first binary signal, having a logic-low level and a logic-high level, modulated by a signal content,
  b. providing a reference binary signal by modulating a reference stage, having a reference logic-low level and a reference logic-high level, modulated by said signal content,
    i. providing at least one first-peak-measure of one of said logic levels of said first binary signal,
    ii. providing at least one reference-peak-measure of the corresponding logic levels of said reference binary signal,
comparing said first-peak-measure and said reference-peak-measure to obtaining a measure of said signal property. Here the term signal property is taken to mean a property of the first binary signal unrelated to the signal content, such as the modulation amplitude, the logic-low level, logic-high level and mid-logic level (i.e. the center between the logic-low and logic-high levels). The phrase "corresponding logic levels" means that the peak measure of logic-low of the first binary signal is compared to the peak measure logic-low signal of the reference binary signal and similarly the measures of logic-high will be compared.

By providing peak-measures, e.g. via peak detectors, of the reference signal as well as the first binary signal a relative measure of the first-peak-measure relative to the reference-peak-measure of the reference binary signal is obtainable. Since the two signals are based on the same signal content a robust relative measure is obtainable even though the peak-measures may be imperfect. As an example consider that substantially identical peak detectors are applied to provide the first-peak-measure and the reference-peak-measure and these peak detectors are too slow to provide an accurate measure of the amplitude independent of signal content. The deviation of the peak-measure from the true amplitude of the respective signal will then depend on the signal content. However, due to the identity of the signal content between the first- and reference binary signals the peak detectors will likely have corresponding relative deviations from the correct measurement at least when issues such as noise are ignored. Therefore, while the absolute levels obtained via the peak detectors may deviate from the actual level of the signal the relative measurement is likely to be substantially correct. Accordingly, by one embodiment of the invention it is possible to determine signal properties such as the logic level of binary signal while relaxing the requirements to the peak detectors which in turn may allow the application of simpler peak detectors, the application of less power consuming peak detectors and/or a more robust detection of the signal property. In one embodiment the peak detectors average over at least 1/10 of a bit period, such as over more than 1/5 of a bit period, such as over more than 1/2 of a bit period, such as over more than 2/3 of a bit period, such as over more than 3/4 of a bit period, such as over more than 1 bit period, such as over more than 1.5 bit period, such as over more than 2 bit periods, such as over more than 3 bit periods, such as over more than 4 bit periods, such as over more than 5 bit periods, such as over more than 7 bit periods, such as over more than 10 bit periods, such as over more than 25 bit periods, such as over more than 50 bit periods, such as over more than 100 bit periods, such as over more than 250 bit periods, such as over more than 500 bit periods, such as over more than 1000 bit periods, such as over more than 5000 bit periods, such as over more than $10^4$ bit periods, such as over more than $10^5$ bit periods, such as over more than $10^6$ bit periods, such as over more than $10^7$ bit periods, such as over more than $10^8$ bit periods, such as over more than $10^9$ bit periods, such as over more than $10^{10}$ bit periods, such as over more than $10^{11}$ bit periods, such as over more than $10^{12}$ bit periods. In one embodiment these numbers of bit periods may be converted to time using any of the rates 1 Mbit/s, 10 Mbit/s, 100 MBit, 1 Gbit/s, 10 Gbit/s, 20 Gbit/s, 50 Gbit/s, 100 Gbit/s.

In one embodiment the invention relates to a circuit implementing the method described above such as in an optical receiver/driver circuit for processing a binary modulated by a signal content comprising:
  a) circuitry for providing a first binary signal having a logic-low level and a logic-high level and modulated by said signal content,
  b) a reference stage providing a reference binary signal, having a reference logic-low level and a reference logic-high level, modulated by said signal content,
    i) a first peak detector arranged to provide at least one first-peak-measure of one of said logic levels of said first binary signal,
    ii) a reference peak detector providing at least one reference-peak-measure of the corresponding logic levels of said reference binary signal,
  c) circuitry for comparing said first-peak-measure and reference-peak-measure.

Determining signal properties, such as the logic level of a binary signal for example received in an optical receiver, may have many applications. The invention may also find applications in an optical transmitter or transceiver comprising a driver circuit described above connected to a light source (see e.g. FIG. 5a-c), such as a VCSEL, or optical receiver or transceiver comprising a receiver circuit as described connected to a photo detector, such as a photo diode.

One such application is setting the decision threshold of a receiver, i.e. the threshold level for when a receiver interpret the signal as logic 1 or 0. A well known problem in the art of digital optical communication is the inability to use direct unencoded transmission of data in which the data desired to be transmitted is allowed to have long strings of only ONEs or long strings of only ZEROs. To accommodate changes in the transmitter (e.g. due to changes in the response of the light source) many optical receivers determine the decision threshold based on the average of the received signal. However, this requires the signal to adhere to a maximum transition spacing which in many application means that the data to be transmitted is encoded. Disadvantageously, doing so mandates that a decoder be present in the receiving system to remove the formatting and reconstruct the original data. Also, data transmission efficiency is degraded because of the required extra bits for the encoding. In some optical systems so-called burst-mode transmission is applied where data is received in burst and a preamble prior to each burst is applied to initialize the receiver and set the decision threshold. In some burst mode systems a receiver may sequentially receive signal from multiple transmitters hence possibly increasing the uncertainty of the magnitudes of the received signal. Examples of the initialization includes setting the threshold via the average of the preamble signal or part thereof and/or by applying peak detection of the signal to set the threshold commonly to one half of the sum of the logic-low level and the logic-high level, see e.g. U.S. Pat. No. 5,371,763 which is incorporated in its entirety. In one embodiment a method according to the invention of setting the threshold as described below is applied in the peak detection of a burst mode receiver circuit for example forming part of peak detectors in a receiver circuit found in U.S. Pat. No. 5,371,763 see e.g. FIGS. 1, 6, 8 and 9 and the corresponding description. Another such application is in relation to co-pending U.S. Provisional Patent Application U.S. 61/350,569 and Danish Patent Application PA 2010 00923 both named "Fast optical receiver for unencoded data" wherein a new method of setting the decision threshold is described. These applications are hereby incorporated in their entirety. In summary embodiments of this invention relates to a method where the extinction ratio of the transmitter is assumed constant in the event of long consecutive identical digits (CIDs) of either 1's or 0's, the decision threshold is then determined based on the logic level present and the extinction ratio. In one embodiment a method according to the present invention is applied to determine the logic level in circuit implementing such a method of determining the decision threshold based on the extinction ratio. In one embodiment the present invention is implemented in determining the $P_H$ value and/or the $P_L$ value of any one of the claims of the co-pending application. In one embodiment these values are determined indirectly by applying the present invention to determine the modulation amplitude and bias current when a long CID is not present. An extinction ratio may be determined based on modulation and bias. In the case of a long CID the requirement to the peak detector bandwidth is reduced because the signal is substantially constant so that a relatively peak detector may be applied to determine the logic-level of the CID. During the period of CIDs the decision threshold may determine as disclosed in U.S. 61/350,569 and PA 2010 00923 with an extinction ratio determined via the present invention.

Another application of an embodiment of the present invention relates to U.S. patent application Ser. No. 12/843, 900 named "Self configurable optical link" relates to an optical link for communicating a payload data stream (synonymous with the term signal content) between a near end transceiver and a far end transceiver via an optical communication channel, said near end transceiver comprising a near end receiver (near-Rx) and a near end transmitter (near-Tx) and said far end transceiver comprising a far end receiver (far-Rx) and a far end transmitter (far-Tx), wherein said far-TX is adapted to transmit a link data stream to the near-RX beside the payload data stream from the far end to the near end. In one embodiment the link is arranged so that the link data may be relayed from said near-RX to the near-TX so that adjustment may be made to the near TX according to the link data. In one embodiment this means that the far-RX, which is connected to the near-TX, functions as a monitor of the link quality and provides feedback, via the optical link, to the near-TX. In one embodiment of this invention the link data stream is multiplexed with said payload data steam as a modulation of the payload data stream wherein said modulation is in the form of a least one of DC level modulation, modulation of the modulation current and phase modulation. In one embodiment of the method of the present invention it is applied to determine one or more of a DC level modulation (such as the average of the first binary signal, modulation of the logic-low, logic-high or a modulation of the mid-logic level), and modulation of the modulation amplitude of the first binary signal. An example of the application of an embodiment of the present invention in a driver and receiver for modulating and demodulating a link-data stream (also referred to as sub band data) is provided in relation to FIG. 7 below.

DETAILS OF THE INVENTION

In one embodiment of the method of the invention the method comprises modulating said reference stage with said first binary signal or substantially a copy thereof. In this way the reference stage is modulated by the same signal content as the first binary signal. In most embodiments a delay between two copies of a signal can be tolerated without substantially affecting the accuracy of the determination of signal property because averaging is involved in providing the peak measures.

As mentioned above, one or more peak measures are obtained from the first-binary signal and the reference-binary-signal indicating that these values are measurements obtained via peak detection. However, in some embodiments it may be possible to apply other types of circuits suitable for detecting the amplitude of the signal. The peak detector may be arranged to detect the extreme of the signal waveform which would allow the detectors to e.g. detect peaks caused by transients in the signal. However, in most embodiments the aim is to detect the logic levels. The peak measure may deviate from the actual logic level for example due to bandwidth limitations in the peak detector or through averaging. In some embodiments the peak measure is a derivative of the peak level meaning that there is a functional relationship e.g. scaled and/or offset from the peak level. In one embodiment this function relationship is predetermined whereas in one embodiment it vary for example with the signal content. However, when the peak detectors providing the peak measures from the first and reference binary signals are arranged to relate to the logic levels in the same manner (i.e. have the same functional relationship) this effect will often cancel out in the comparison of peak measures. In one embodiment the peak measure is not a derivative. In general the term "measure" (such as of a signal property) is used in a similar manner as in "peak measure". I.e. the measure of a level provides information of the actual level but may deviate from the true level such as via measurement limitations, averaging and/or other functional relationships, such as via a scaling and/or level shifting.

In the context of the present invention the term "determine" is taken to mean that circuit acquire a measure of a property of the signal waveform e.g. by obtaining a voltage at a point on the circuit, a counter value or a digital value reflecting the measure. For example, in some embodiments of the present invention a current source is regulated via a feed-back loop so that two or more peak-measures match thereby determining a measure of the modulation current in the signal (the magnitude of the adjusted current source, see e.g. FIGS. 2, 4 and 5). Other examples of circuits that may be applied to determine signal properties includes a peak detector circuit and an averaging circuit. An exemplary and non exclusive list of signal properties that may be determined includes average of the signal, maximum, logic-high, minimum value, logic-low and modulation amplitude.

In one embodiment a determined value is available as output from the circuit such as via voltage on a connector or as a readable digital variable. In one embodiment a determined value is not available as an output from the circuit. Given that the properties of the reference binary signal are known (such as reference logic-low level and a reference logic-high level and/or derived parameters such as the modulation amplitude and mid-logic level) the relative measure of the determined logic level may be converted into an absolute measure. This is done by relating the relative difference between the first-peak-measure and the reference-peak-measure to the known reference logic-low level or known reference logic-high level. The logic levels of the reference binary signal are in most embodiments assumed to be substantially set by current sources or combinations thereof in the reference stage. In one embodiment this assumption is more accurate when the reference stage is in limiting i.e. a further increase in the amplitude of the modulation of the reference stage does not affect the modulation amplitude of the reference binary signal. Firstly, this may ensure that the modulation amplitude of the reference binary signal does not depend on the modulation amplitude of the first binary signal. Secondly, the waveform shape, e.g. whether the waveform for a bit is rounded or square, of the first binary signal may be less likely to affect the reference binary signal. In one embodiment the reference binary signal is ideally a substantially binary waveform with the same signal content as the first binary signal and the modulation amplitude substantially determined by the settings of the reference stage alone, such as the magnitude of one or more adjustable current sources. In one embodiment the reference binary signal is ideally a waveform similar in shape to that of the first binary signal with a modulation amplitude substantially determined by the settings of the reference stage alone. In one embodiment the first binary signal is sufficient to bring the reference stage into limiting. In one embodiment the first binary signal is sufficient to bring the reference stage sufficiently close to limiting to obtain an acceptable accuracy, such as within 30% from limiting, such as within 20% from limiting, such as within 15% from limiting, such as within 10% from limiting, such as within 5% from limiting, such as within 1% from limiting. In the alternative, in one embodiment the method of the invention comprises providing a second binary signal being a substantially limited copy of said first binary signal and applying said second binary signal in modulating said reference stage. This is for example done via a limiting amplifier where the first binary signal is the input to said amplifier and the second binary signal is the output of said amplifier. As the second binary signal is a limited copy of said first binary signal a further increase in the amplitude of the modulation of the first-binary-signal does not affect the modulation amplitude of the second-binary-signal, if the amplitude of the limited signal is sufficient to bring the reference stage in limiting. Accordingly, in one embodiment the method of the invention comprises providing said second binary signal as the output from a limiting amplifier having said first binary signal as an input. In one embodiment the method comprises providing said limiting amplifier with a reference voltage $V_{REF}$ as input. As will be discussed further below the invention is in one embodiment implemented in an optical receiver. Such receiver often comprises a limiting amplifier where $V_{REF}$ corresponds to the decision threshold. In one embodiment the second binary signal is the output from such a limiting amplifier in an optical receiver circuit. In one embodiment the term $V_{REF}$ refer to the decision threshold of a receiver in general.

In the present text term "stage" taken to mean a sub-circuit which outputs an output signal based on an input signal with substantially no affect on the input signal. In one embodiment a stage is equivalent to an amplifier and often a stage is operated as a limiting amplifier. For example, a reference stage is in this context a sub circuit, preferable operated in limiting, arranged to provide an output signal in response to an input signal where the modulation magnitude and/or the mid-logic level is adjustable or predetermined.

In one embodiment the reference logic-low level, the reference logic-high level, the logic-low level and/or the logic-high level is adjustable for example by adjusting one or more current sources in the reference stage. In one embodiment by adjusting one or components in a transimpedance amplifier receiving a photo current from a photo diode. In this way the first binary signal and/or the reference binary signal may be adjusted relative to one another such as to more accurately accommodate different signal levels as the accuracy of the determination of signal property of the first binary signal, such as the modulation amplitude or the logic-low level, may depend on the relative difference to the reference binary signal. Another use of such adjustability is to provide a measure of signal property of the first binary signal by matching the reference binary signal and the first binary signal via a feedback loop and determine the measure of signal property based on the adjusted variable(s). Accordingly, in one embodiment the method of the invention comprises applying said comparing as an error signal in a feedback loop arranged to adjust said reference logic-low level and/or said first logic-low level so that said first peak measure and a corresponding reference-peak-measure become substantially equal. The phrase "substantially equal" clarifies that the equality may be affected by the resolution, accuracy and update speed of the system. However, it is also within the scope of the invention to allow a margin or error between the two values such as less than 25%, such as less than 20%, such as less than 15%, such as less than 10%, such as less than 5%, such as less than 2%, such as less than 1%. Furthermore, in some embodiments a predetermined function may relate the values of the first and reference binary signals. Such a functional relationship is in one embodiment a scaling and/or an offset. As long as this functional relationship is considered in the comparison as well as in the adjustment so that the functional relationship effectively cancels out in the feedback loop, the levels are considered to be "substantially equal". In one embodiment the method of the invention comprises applying said comparing as an error signal in a feedback loop arranged to adjust said reference logic-high level and/or said first logic-high level so that said first peak measure and a corresponding reference-peak-measure become substantially equal within a predetermined factor and/or an offset. In one embodiment the predetermined factor is substantially 1 and in one embodiment the offset is substantially zero. However, in some embodiments it may be advantageous to scale and/or offset either the reference or the first binary signals in order to e.g. conserve power or to increase accuracy. In one embodiment the first binary signal and the reference binary signals are matched by matching the respective logic-low levels and the respective logic-high levels.

In one embodiment the average levels of the first and reference binary signals are applied in obtaining said measure of the signal property of the first binary signal. Accordingly, in one embodiment the method of the invention comprises obtaining a measure of the average of the first binary signal and obtaining a measure of the average of the reference binary signal. In one embodiment these average signals may be employed in matching the first and reference binary signals, so that in one embodiment the method of the invention comprises comparing said averages to determine an error signal, and applying said error signal in a feedback loop arranged to adjust the average of the first binary signal and/or the average of the reference binary signal. In one embodiment the first binary signal and the reference binary signals are matched by said average level and matching the respective logic-low levels and/or the respective logic-high levels.

One advantage of this method is that in one embodiment it is not required that the signal content comprises sufficient transitions for the signal average to reside substantially in the center between the logic-low and logic-high levels as the first and reference binary signals comprises the same signal content and the average level is therefore likely shift relative to the center value by the same relative amount.

In embodiments where the signals are not matched but the method of the invention is applied to determine a relative measure of a logic level of the first binary signal along with the average of the first binary signal it is in one embodiment possible to determine the modulation amplitude, the extinction ratio and the other logic level. However, this determination will in most embodiments rely on the signal content having sufficient transitions so that the average level reside substantially center between the logic-low and logic-high levels. In one such embodiment the signal content has been encoded to ensure sufficient transitions. In one embodiment the method relies on the extinction ratio of the signal being substantially constant. In one such embodiment this method is combined with any of the embodiments of co-pending U.S. Provisional Patent Application U.S. 61/350,569 and Danish Patent Application PA 2010 00923 both named "Fast optical receiver for unencoded data" which were also discussed above.

In one embodiment the first binary signal is a voltage $V_L$ from a first binary current signal measured over a load resistor $R_L$ and said reference binary signal is voltage from reference binary current signal measured over a load resistor $R_{LRef}$. In one embodiment $R_{LRef}$ is substantially equal to $R_L$ so that equal voltage across the resistors corresponds to substantially the same current flowing through each resistor. In one embodiment a predetermined factor relates $R_{LRef}$ and $R_L$. A larger $R_{LRef}$ may in one embodiment conserve power consumption of the reference stage, as a smaller current in the reference stage may match the voltage across $R_L$. A smaller $R_{LRef}$ may in one embodiment provide for a higher accuracy in matching of currents, as a higher resolution in the voltage across $R_{LRef}$ may be obtained using the same subdivisions of the current through the resistor.

In one embodiment the method further comprises biasing said reference load resistor $R_{LRef}$ with a bias current $I_{BRef}$ and in one embodiment the method further comprises biasing said load resistor $R_L$ with a bias current $I_B$. In one embodiment said load resistors and bias currents are arranged so that $R_L \cdot I_B \approx R_{LRef} \cdot I_{BRef}$ which in one embodiment leaves room for the relation of $R_{LRef}$ and $R_L$ by a predetermined factor as discussed above.

In one embodiment the first binary signal is a single ended signal; however, it may also be a differential signal. Similarly for the second binary signal.

In one embodiment the method of the invention comprises providing a modulation current $I_{REF-M}$ to the reference stage thereby setting the amplitude of said reference binary signal. As discussed above the reference binary signal may be a voltage across a load resistor $R_{LRef}$. In this case $I_{REF-M}$ sets the amplitude of said reference binary signal as the modulation amplitude of the voltage across the load resistor $R_{LRef}$. In one embodiment $I_{REF-M}$ constitutes a measure of the modulation current of the first binary signal. In one embodiment the method of the invention further comprises biasing the reference stage with a current $-I_{REF-M}/2$ so that change in $I_{REF-M}$ does not substantially affect the midpoint between the reference logic-low level and the reference logic high level.

In one embodiment the method further comprises biasing said load resistor $R_L$ with an additional adjustable current $I_{B2}$. In one embodiment the method comprises applying an error signal arising from said comparing of measures of the logic-low levels, logic-high levels and/or averages to adjust $I_B$ and/or $I_{B2}$. For example, in one embodiment applying a feedback loop to adjust $I_{B2}$ to be substantially equal to an average level of the first binary current signal using said comparison as an error signal. In one embodiment $I_B$ and/or $I_{B2}$ constitutes a measure of the mod-logic level and/or the average of the first binary signal. In one such embodiment $I_{B2}$ is arranged to substantially cancel out the mid-logic level of the first binary signal so that average level is maintained at the level provided by $I_B$. An example of such an embodiment is discussed below in relation to the receiver shown in FIG. 4.

In one embodiment the voltage $V_{REF}$ is provided by providing a current substantially equal to $I_B$ through a resistors substantially equal to $R_L$. In one embodiment this may cause the limiting amplifier and/or decision threshold of a receiver to have a decision threshold corresponding to the bias level. In one embodiment the method comprises adjusting $I_B$ so that $V_{REF}$ is substantially equal to the mid-logic level of the first binary signal, such as via a feedback loop.

As noted above the method is in one embodiment implemented into an optical receiver. In one embodiment the method of the invention therefore comprises providing said first binary signal as a as a function of a received photo current in an optical receiver. Most optical receivers applies a transimpedance amplifier (TIA) to convert received photo current to a voltage in the present context the circuit converting from photocurrent to a voltage is more generally referred to as a TIA input stage. I.e. a TIA input stage is sub circuit of a receiver circuit suitable for being connected to a photo detector and providing a voltage waveform (here $V_{TIA}(t)$) in response to a current from the photo detector. In one embodiment the biasing of $R_L$ discussed above comprises biasing said TIA input stage. One common function of biasing is to shift the DC value of the output and/or to adjust the bandwidth of the amplifier which is often a function of the signal current level. In one embodiment the output of the TIA input stage or transimpedance amplifier is the first binary signal.

In one embodiment the invention may be applied to determine properties of a drive current signal in a circuit for driving a light source. Such a light source may for example be a semiconductor light source such as LED, VCSEL or other types of semiconductor lasers. Depending on the design of the driver output stage the current actually driven to the light source may be difficult to predict based on the input parameter to the driver output stage such the adjustment of modulation and bias currents. Here the term "output stage" means a sub circuit of a driver circuit suitable for being connected to a light source and arranged to output a drive current in response to an input signal. The lack of predictability may be caused by the electrical characteristics of the light source being non-linear and/or the characteristics changing e.g. due to changes in temperature. In one embodiment of the method of the invention this is implemented to determine the values of the modulation and/or bias currents in the drive signal. Accordingly, in one embodiment said first binary signal is a function of a current output of a driver output stage for a light source. The first binary signal could be the drive signals itself or a derivative thereof such as a copy thereof. In one embodiment the load resistor is connected in series with the light source. In one embodiment the light source is biased with a current substantially equal to $I_B$ biasing the reference stage as discussed above. In one embodiment the second binary signal is an input to said driver output stage or substantially a copy thereof. Often the input signal to a drive signal is limited or otherwise suitable to ensure that reference stage is in limiting or close to that as discussed above.

In one embodiment the measurement of the drive current may be applied to adjust the drive current to yield the desired properties. It may, as an example, have been determined that a specific light source requires a specified bias and modulation current to provide the desired bandwidth and extinction ratio. By implementing an embodiment of the method of the invention and adjusting the drive current until the specific bias and modulation currents are obtained it may be ensured that the transmitted signal has the desired properties. In one embodiment such adjustment is implemented via a feedback loop. Accordingly, in one embodiment the one or more feedback loops are arranged to adjust the logic-low level and/or the logic-high level of the first signal binary signal (such the drive waveform or a signal derived from that and/or a filtered version of that) to be substantially equal to said reference logic-low level and/or reference logic-high level, respectively. In this way the settings for the reference signal indirectly controls the drive current because one or more feedback loop are applied to make the drive signal substantially equal to the reference signal. The settings for the reference, e.g. modulation amplitude, thereby becomes measures of the drive waveform. Similarly to the discussion above, the average of the first binary signal and the reference signal may also be applied in such a feedback arrangement.

In one embodiment the driver output stage is based on an emitter follower. Such a drive stage may have the advantage that it may have better matching and less ringing on the interface to the light source. However, for such a drive stage it may be difficult to control the drive currents. In one embodiment of the method of the present invention is therefore implemented as explained above. Accordingly, in one embodiment the drive stage comprises an emitter follower comprising a transistor having emitter, collector and base connections said driver output stage being arranged to allow a light source to be connected to said emitter connector. In one embodiment the driver output stage further comprises a resistor connected in series so that the current through the resistor is substantially equal to the current through the light source. This resistor may be advantageous as the current through the light source may be measured as the voltage across the resistor. This driver output stage design may also find other applications than the present invention.

As noted above one application of the present invention is in an optical link where a link data stream is modulated onto signal carrying the payload data stream, such as by modulating the DC value and/or the modulation current. The link data may also be modulated onto the logic-high and/or logic-low levels which may be equivalent to modulating and/or the modulation current with the link data stream.

Co-pending U.S. patent application Ser. No. 12/843,900 named "Self configurable optical link" to the same assignee is related to such an optical link. In one embodiment the present invention is implemented in the receiver and/or transmitter of such a link. This is exemplified further in relation to FIG. 7 below. In one embodiment the link is a two-way link so that both ends comprise a transceiver module in which case the invention may be implement in the receiver and/or transmitter portion of the transceiver. Commonly, the bandwidth of the link data is much lower than bandwidth of the payload such e.g. Kbits/s or Mbits/s relative to Gbits/s which may provide relatively simple separation of the signals. However, in one embodiment the bandwidth of the link data stream is relatively close to the bandwidth of the payload data stream because the present invention may provide fast detection of changes in the logic level(s). The link data stream does not necessarily need to comprise data related to link quality but may be available for communicating other types of data as well.

In one embodiment the method is implemented in a receiver and the comparing of measures (e.g. peak measures and/or measures of averages) is then modulated with the link data stream. In other words, a property of the received signal measured is modulated with the link data stream and this modulation is then identifiable in the comparison. In one embodiment where a feedback loop is implemented the link data stream may be demodulated from the error signal in the feedback loop, so that in one embodiment the error signal is demodulated to extract a data signal modulated onto the modulation amplitude of said received photo current. Alternatively, the link data stream may be demodulated from the property adjusted (e.g. a current source) by the feedback loop.

In one embodiment the method is implemented into a transmitter which further is arranged to modulate the payload data stream with a link data stream. In one embodiment of the method of the invention this means that the method further comprises modulating the modulation amplitude, average, the first logic-low level and/or first logic-high level of said first binary signal with a link data stream. As explained above the settings of the reference stage may be applied to control the drive signal. Thus, in one embodiment modulation of the drive signal is performed by applying the modulation with the link data stream to one or more components of the reference stage such as a bias current source and/or modulation current source of the reference stage.

In one embodiment of the method of the invention the method of the invention is applied as part of a calibration or initialization procedure for example to determine the effect of adjusting a given parameter. For example, it may be efficient to determine the response in drive current to increments in a given current source. Once determined the system may simply apply the determined coefficient(s) when adjusting the drive current rather than an actual feedback loop which may be faster and/or more energy efficient in some applications.

As discussed above, embodiments of the present invention may be particular advantageous for higher data rates as reliable peak detection often becomes challenging. Accordingly, in one embodiment of the invention the invention is incorporated into an integrated circuit in particular into an integrated circuit suitable for operating with a first binary signal having a bit rate higher than or equal to 5 Gbit/s, such as higher than or equal to 10 Gbit/s, such as higher than or equal to 20 Gbit/s, such as higher than or equal to 25 Gbit/s, such as higher than or equal to 50 Gbit/s, such as higher than or equal to 100 Gbit/s.

DESCRIPTION OF DRAWINGS

FIG. 5b shows a variation of the exemplary circuit of FIG. 5a.

FIG. 6b Shows a superposition of the signal from 4 µs to 6 µs shown in FIG. 6a.

FIG. 6c Shows a superposition of the signal from 1 µs to 6 us shown in FIG. 6a.

FIG. 1 shows an exemplary binary signal. Throughout the present text the term "binary signal" refers to an amplitude modulated NRZ signal. However, the invention may also find applications for other signal types such as signals for which where it may be beneficial to determine the modulation amplitude. The units in FIG. 1 are arbitrary. The logic-low level is located at 1 whereas the logic-high level is located at 3. The logic levels are in one embodiment defined as the average level taken over a time period after any transients has died out. Alternatively, the logic levels may be defined as the average level of the signal in a bit period where no transients occur e.g. the level of the middle "1" when the sequence is 111. In the present example such definitions mean that the spikes at each transition are ignored or substantially ignored. In general the logic-low and logic-high level in a signal (voltage, current or power) is a level representing a binary digit in the signal. In many embodiments it is preferable that the peak detectors ignore, e.g. by having a limited bandwidth, the transient spikes 5, because such spikes are not necessarily mirrored to the reference binary signal. On one embodiment a filter is applied to reduce such spikes (see e.g. FIG. 5b). However, it may be feasible to detect these spike values in some embodiments. The modulation amplitude, i.e. the absolute value of the difference between the logic levels 1, 3 is indicated by the arrow 4. The mid-logic level 2 is the center value between the logic levels 1, 3. The signal content i.e. the data signal to be transmitted being a sequence of binary digits used to modulate the voltage (alternatively current or power) to form a signal waveform, such as the curve of FIG. 1. Considering the logic-high value 3 at about 2.695 V as "1" and the logic-low value 1 at about 2.645V as "0" the signal content corresponds to the digits 6.

FIG. 2 shows an exemplary circuit for an optical receiver according to the invention. The anode of a photo diode 20 is connected to the TIA input stage 21 whereas the cathode of the photodiode is connected to a supply voltage 201 here referred to as $V_{DD}$. In some embodiments the cathode may be connected to further circuitry such as for biasing the photo diode and/or for measuring the average photo current received e.g. for use in an received signal strength indicator (RSSI) measurement circuit. In many applications the photodiode 20 will be an external component so that the photodiode is connected to the chip comprising the remainder of this circuit e.g. via a wire bond or solder bump connection. In this example the TIA input stage is formed by a current mirror formed by the transistors 212, the load resistor $R_L$ 211 a bias current source 210 producing the current $I_B$ and the resistors $R_E$ 213 and 214. The output of the TIA input stage is the voltage $V_{TIA}$ which in this case is the supply voltage at 201 reduced by the voltage drop over $R_L$ 211. The photocurrent may be described as the sum of an current $I_{PD-AVG}$ and a modulation signal comprising the signal $I_{PD-MOD}(t)$ where t signifies time, i.e. $I_{PD}(t)=I_{PD-AVG}+I_{PD-MOD}(t)$. While other variables, such as $I_{PD-AVG}$, may be time varying we reserve the annotation (t) for variables that vary with the signal content. Here the subscript avg, such as in $I_{PD-AVG}$, refers to the average of the logic-high level and the logic-low level rather than the mathematical average $<I_{PD}(t)>$. This also means that $I_{PD-MOD}(t)$ may have a non-zero DC-value. In case of a balanced signal, i.e. an equal number of 0's and 1's of equal length in a signal then $I_{PD-AVG}=<I_{PD}(t)>$ and the DC-value of $I_{PD-MOD}(t)$ will have a zero DC-value. Balanced is in this context taken to mean that the number of 0's and 1's is equal over a time period which is long compared to relevant time constants in the system. For example the known 8b/10b encoding ensures that the count of 0's and 1's in a string of at least 20 digits is no more than 2 and that there are no more than 5 consecutive identical digits (CID). In one embodiment "balanced" is taken to mean that signal is substantially balanced within a time period where substantially balanced meaning that the maximum difference in the count of 0's and 1's is less than or equal to 50%, such as less than or equal to 40%, such as less than or equal to 30%, such as less than or equal to 20%, such as less than or equal to 15%, such as less than or equal to 10%, such as less than or equal to 5%, such as less than or equal to 2%, such as less than or equal to 1%. The time period is in one embodiment longer than or equal to the duration of 10 bits, such as longer than or equal to the duration of 20 bits, such as longer than or equal to the duration of 50 bits, such as longer than or equal to the duration of $10^2$ bits, such as longer than or equal to the duration of $10^3$ bits, such as longer than or equal to the duration of $10^4$ bits, such as longer than or equal to the duration of $10^5$ bits, such as longer than or equal to the duration of $10^6$ bits, such as longer than or equal to the duration of $10^7$ bits, such as longer than or equal to the duration of $10^8$ bits, such as longer than or equal to the duration of $10^9$ bits, such as longer than or equal to the duration of $10^{10}$ bits, such as longer than or equal to the duration of $10^{11}$ bits, such as longer than or equal to the duration of $10^{12}$ bits, such as longer than or equal to the duration of $10^{13}$ bits, such as longer than or equal to the duration of $10^{14}$ bits, such as longer than or equal to the duration of $10^{15}$ bits. Also, when reference is made to a DC value, this is taken to be a value which is substantially constant within one of the time periods specified above. Substantially constant is meant as constant relative varying values related to the constant value. In one embodiment substantially constant is taken to mean that the value varies less or equal to 50%, such as less than or equal to 40%, such as less than or equal to 30%, such as less than or equal to 20%, such as less than or equal to 15%, such as less than or equal to 10%, such as less than or equal to 5%, such as less than or equal to 2%, such as less than or equal to 1%, such as less than or equal to 0.5%, such as less than or equal to 0.2%, such as less than or equal to 0.1%, such as less than or equal to 0.001%.

The current mirror will substantially mirror the bias current $I_B$ provided that the transistors 212 are biased in the same way. In one embodiment it is therefore preferred that $I_B>>I_{PD-AVG}+I_{PD-MOD}(t)$ and we assume this assumption to be the case in this example. The output of the TIA input stage is then $V_{TIA}(t)=V_L(t) \approx V_{DD}-R_L(I_B-I_{PD-AVG}-I_{PD-MOD}(t)$. The current through the load resistor $I_L(t)=I_B-I_{PD-AVG}-I_{PD-MOD}(t)$ may be said to be the first binary current and voltage $V_{TIA}(t)$ may be said to constitute the first binary signal.

Two peak detectors 22,23 are arranged to detect the levels of the logic-high ($V_{PH-TIA}$) and logic-low ($V_{PN-TIA}$) of first binary signal $V_{TIA}(t)$, i.e. a first-peak-measures. The peak detectors are in this example constructed as a simple combination of a diode and a capacitor. In principle any peak detector may be applied. As noted above, the invention may have the advantage that less sophisticated peak detectors may be applied. In one embodiment it is ensured that the peak detectors are sufficiently slow, i.e. averaging, that the influence from transients in the signal is negligible. Examples of the extent of this averaging were discussed above. Assuming unity gain in the peak detectors the peak detectors will output a first peak measure as:

$V_{PN,TIA} = V_{DD} - \alpha R_L(I_B - I_{PD\text{-}AVG} - I_{PD\text{-}logic\text{-}high}) + \text{Offset}_{PN}$ (output from the peak detector 22), $V_{PH,TIA} = V_{DD} \beta R_L(I_B - I_{PD\text{-}AVG} - I_{PD\text{-}logic\text{-}low}) + \text{Offset}_{PH}$ (output from the peak detector 23).

Figure 1:
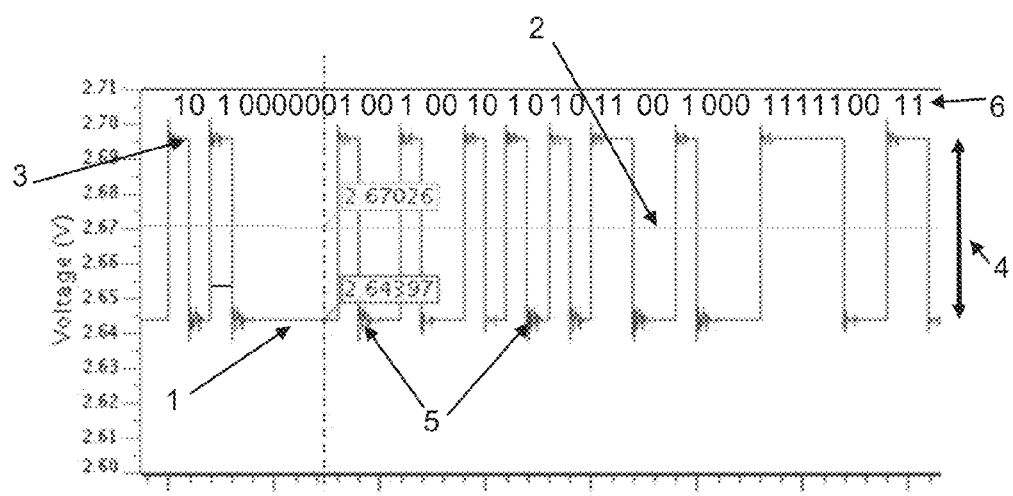
FIG. 1 Shows a binary signal along with indications of the logic levels, the bias value, modulation amplitude and the mid-logic level.
Figure 2:
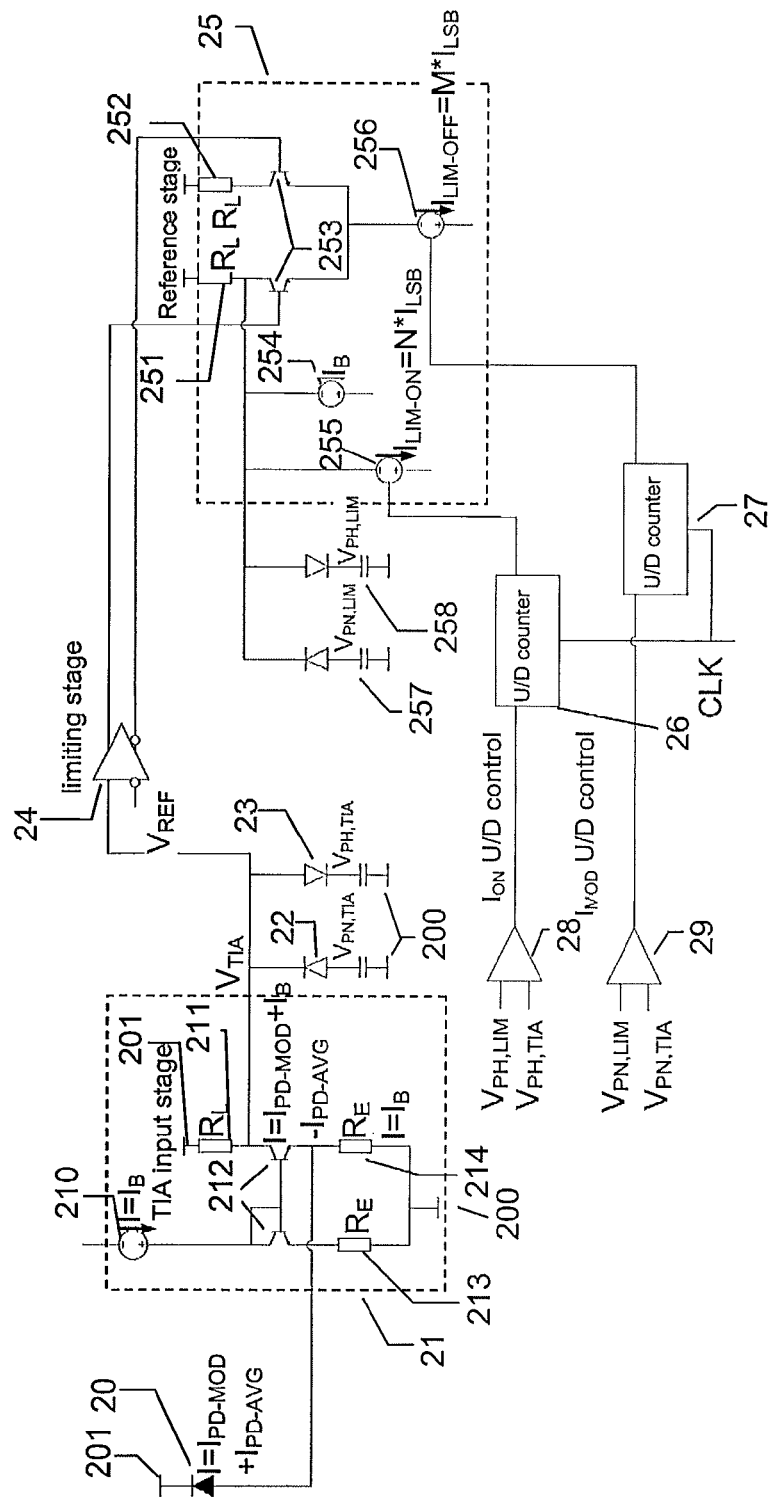
FIG. 2 Shows an exemplary circuit for an optical receiver according to one embodiment of the invention.

Note that due to the inversion of the photo current in the $V_{TIA}(t)$, the high level of $V_{TIA}(t)$ will be for low levels received by the photodiode i.e. $I_{PD\text{-}logic\text{-}low}$. Here the values α and β indicate an off-set from the true logic levels which may change due to changes in signal content. For example, a long sequence of 1's will in one embodiment cause a to approach unity whereas β will likely deviate further from unity. In one embodiment the peak detector is so arranged that the measured level will deviate from the actual level by an offset. In the example of FIG. 2, the output from the peak detectors, in this case the voltage across the capacitors, will be offset by the forward bias voltage of the diodes in the peak detectors 22, 23 leading to a positive $\text{Offset}_{PL}$ and a negative $\text{Offset}_{PH}$. However, assuming that the peak detectors of the reference stage have the same offset, this offset may be ignored for that purpose. In one embodiment one or more offsets of a peak detector may cause the measured peak value to reside outside the range of the supply voltage e.g. above $V_{DD}$ or below ground. In one embodiment this causes an issue for the circuitry comparing the peak-measures. In one embodiment a level-shifter, i.e. a circuit providing an offset, is incorporated to shift the first binary signal and in one embodiment the reference binary signal is similarly shifted. In one embodiment the level-shifter is part of a peak detector. In another embodiment the actual signal is shifted. For simplicity level-shifters are omitted in FIG. 2.

In the example of FIG. 2 the $V_{TIA}(t)$ is fed into a limiting amplifier 24. A reference voltage $V_{REF}$ is also input to the limiting amplifier 24. The output of the limiting amplifier corresponds to the second binary signal which is used to drive the reference stage 25. The reference stage is in this example formed by the transistors 253 and the load resistors 251, 252 along with the current sources 254, 255 and 256. The output of the reference stage 259 is connected to peak detectors 257, 258. The peak detector output may be written as:

$V_{PN,LIM} = V_{DD} - \alpha R_L(I_B + I_{LIM\text{-}ON} + I_{LIM\text{-}OFF}) + \text{Offset}_{PN}$ (output from the peak detector 258), $V_{PH,LIM} = V_{DD} - \beta R_L(I_B + I_{LIM\text{-}ON}) + \text{Offset}_{PH}$ (output from the peak detector 257).

Also, similarly to the discussion in regard to the detectors 22, 23 it may in some embodiments be necessary to implement a level shifter. In one embodiment the difference between the peak-measures may provide a measure of the modulation amplitude of the signal from the photodiode as well as the logic-mid, logic-high and/or the logic-low level. However, in the embodiment of FIG. 2 the comparators 26, 27 allows the reference-binary-signal to be adjusted so that peak measures of the first and reference binary signals are substantially identical. This in turn may ensure that peak detectors 22 and 258 as well 23 and 257 experience substantially the same working conditions which may improve accuracy.

In the present example, the current source 256 substantially sets the modulation amplitude of the reference binary signal, whereas the combination of the sources 254, 255 sets the logic-low level. In this embodiment the logic-low and the modulation amplitude of reference binary signal are adjustable via the current adjusting the current sources 255, 256. By comparing the first-peak-measures of the first binary signal ($V_{PN,TIA}$, $V_{PH,TIA}$) and the reference-peak-measures ($V_{PN,LIM}$, $V_{PH,LIM}$) in the comparators 28,29 and adjusting the current sources 255,256 via the up/down counters 26,27 the circuit may adjust reference-binary-signal so that $V_{PN,TIA} = V_{PN,LIM}$ and $V_{PH,TIA} = V_{PH,LIM}$. This in turn implies that $I_{LIM\text{-}ON} = -I_{PD\text{-}AVG}$ (current source 255)

$I_{LIM\text{-}OFF} = -(I_{PD\text{-}logic\text{-}high} - I_{PD\text{-}logic\text{-}low})$ (current source 256), so that the current source 255 is adjusted to provide a current to cancel out the logic-mid level of the current from the photodiode and the current source 256 is adjusted to provide a current corresponding to the modulation amplitude of the current from the photodiode (with reverse sign). The magnitude of the current source 256 may therefore be said to provide a measure of the modulation amplitude of the first binary signal and thus also the modulation amplitude of the photocurrent. In this embodiment the current sources 255,256 are digitally controllable current sources providing a current which is a multiplier (N and M respectively) time a unit current $I_{LSB}$. The value of N may hence be said to indicate the logic-mid level of the photocurrent and the value M indicates the modulation amplitude.

In the above analysis of the circuit of FIG. 2 it has been implicitly assumed that the reference voltage $V_{REF}$ is located sufficiently close to the mid point of the logic-high and logic-low levels of $V_{TIA}(t)$ so that the reference binary signal comprises the same signal content. In one embodiment $V_{REF}$ is located so the limiting amplifier 24 is in limiting for $V_{TIA}(t)$ assuming its logic-high and logic-low levels. In one embodiment $V_{REF}$ is adjusted via a feedback circuit. In one embodiment the feedback circuit is coupled to the counter for N so that $V_{REF}$ is set relative to the voltage corresponding to the logic-mid level of the photocurrent, such as substantially equal to the logic-mid level of $V_{TIA}(t)$. In one embodiment the feedback circuit is coupled to $V_{PN,TIA}$ and $V_{PH,TIA}$ the counter for N and M so that $V_{REF}$ is set as the mid between $V_{PN,TIA}$ and $V_{PH,TIA}$.

In one embodiment of the receiver of FIG. 2 (as well as other embodiments of the invention) it may be necessary to handle a large range in one or more of the adjustable current sources while at the same time having sufficient accuracy of the generated currents. This means that the resolution of the current source must be very good when the photo diode input currents are at their lower limits. In the example discussed below a minimum input level is approximately 100 μA, which means that a resolution of 1 μA will be necessary to obtain 1% accuracy. At the same time the maximum received current may be almost 10 times larger. In one embodiment the adjustable current source is constructing by having a number of sub current sources in parallel which may be switched in or out depending upon the desired output. With a resolution of 1 μA each sub current source could in one embodiment have that output current and with maximum input current of 1 mA it could be necessary to have up to 1000 sub current sources in parallel. In one embodiment such a high number of current sources is not practical.

Figure 3:
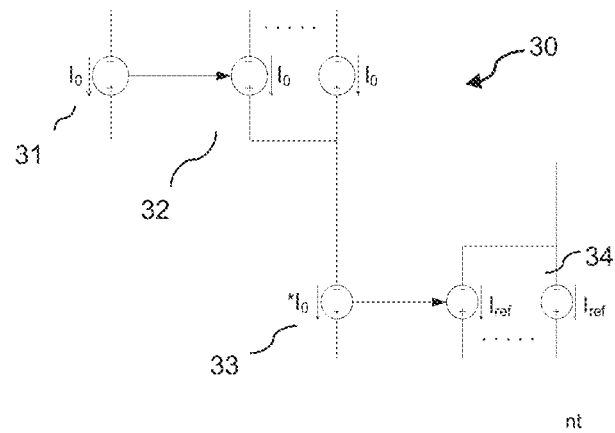
FIG. 3 Shows an exemplary circuit for implementing an digitally adjustable current source FIG. 4 Shows an exemplary circuit for an optical receiver according to one embodiment of the invention.

In one embodiment a good relative accuracy is sufficient. In one embodiment the current source may therefore be constructed by mirroring a reference current source to the sub current sources. Hence, in one example the reference current source may be set to 1 µA at the lowest input levels and 10 µA at the largest input levels. This will result in a 1% resolution independent of the input current levels. A system for providing such a current source is shown in FIG. 3. The system 30 is formed by a base current source 31 providing a current $I_0$. This current may for example be provided using a bandgap reference. The magnitude of the current from the reference current source 33 is set by a set of parallel sub current sources 32 which may be digitally switched in or out (switches not shown) depending on the desired magnitude of 33. The set of sub current sources 32 is in one embodiment substantially identical current source each providing a current $I_0$ mirrored from the source 31. For example $I_0$=1 µA and 32 comprises 10 sub current sources so that the reference current source may be varied between 1 µA and 10 µA. In another embodiment the set of current sources is formed by sub sources of various sizes and the mirroring of the current from the source 31 is multiplied by various factors. For example, the source 32 could comprise one sub source of 5 times $I_0$, 2 sub sources of 2 times $I_0$ and one sub source of 1 time $I_0$ which reduces the number of sub sources required to produce between 1 and 10 times $I_0$ and hence also reduces the number of bits needed to set the value of the reference source 33. The reference source 33 is further mirrored to the current source 34 which, similar to the source 33, is formed by a set of parallel connected sub source so that the value of the source 34 may be varied digitally by switching the required number of sub sources. Similar to the source 32, the current source 34 may be formed by a set of substantially identical sources or sources of varying magnitude where the latter requires a varying mirror factor from the source 33. In one embodiment the sources 34 comprises 100 sub sources of substantially identical magnitude mirrored from 33. If the source 32 is variable between 1 µA and 10 µA, the output of 34 is now variable from 1 µA to 1 mA. In one embodiment it is practical to further cascade the current sources i.e. to further mirror the output of the source 34 to a further source formed by sub sources in parallel.

In some cases the received photocurrent remains substantially within a specific range. Therefore, in one embodiment, the current source 3 is initialized by first determining a suitable magnitude of the reference source 33 (e.g. with 50% of the sources of 34 coupled in) after which only the source 34 is varied.

Figure 4:
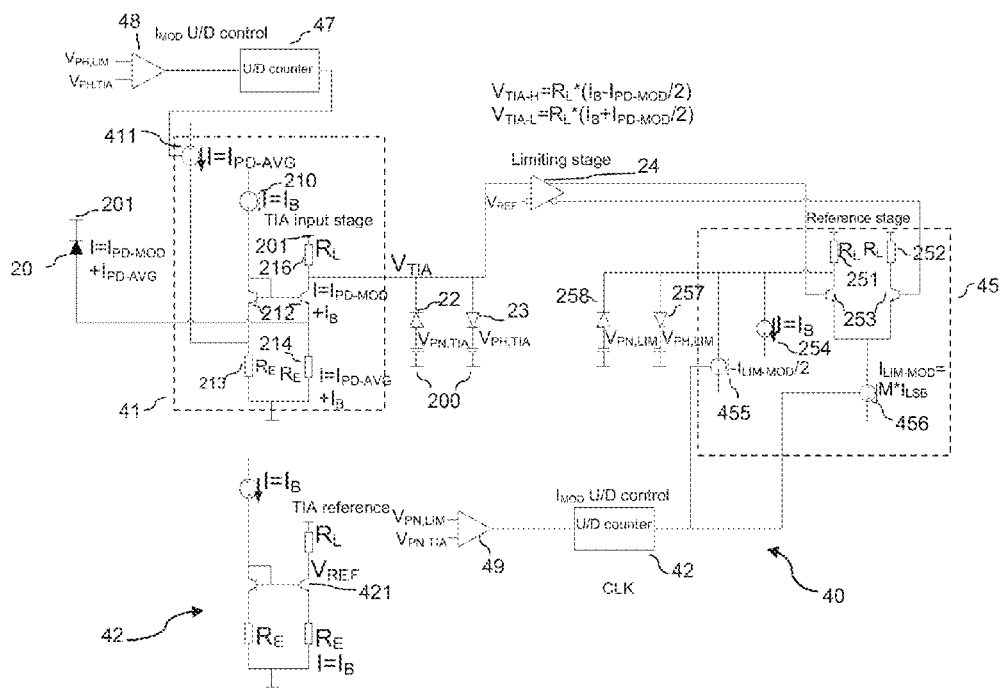

FIG. 4 shows an embodiment of the invention similar to that of FIG. 2. However, in this embodiment the feedback loop is arranged to adjust the off-set of the $V_{TIA}(t)$ as well as the modulation amplitude of the reference stage 45. The TIA input stage 41 and the circuit 42 are both biased by a current $I_B$. The circuit 42 is formed by transistors and resistors of magnitude substantially identical to those forming the reference stage 41. This is to allow the circuit 42 to generate a voltage $V_{REF}$ at the node 421, which is fed to the limiting amplifier 24. Due to correspondence between the circuit 42 and TIA input stage 41 the voltage $V_{REF}$ substantially correspond to a current of zero being received from the photo diode 201. When the photo current has a non-zero logic-mid level, $I_{PD-AVG}$, the comperator 48 and the up/down counter 47 is arranged to adjust the current source 411 so that this substantially balances the logic-mid current by the amount $I_{PD-AVG}$. This in turn causes $V_{TIA}(t)$ to vary with the modulation amplitude centered around the value $V_{REF}$. This arrangement has the advantage that the working point of the limiting amplifier 24 is substantially constant. Relative to the embodiment of FIG. 2, the current sources 455 and 456 are now linked so that the current of the source 455 equals −½ of the value of the source 456, and both sources are now adjusted by the same comparator 49 and up/down-counter 46. This link ensures that the reference signal has a constant center value, i.e. $I_B \cdot R_L = V_{REF}$, substantially equal to that of $V_{TIA}(t)$ regardless off the value of the current source 456. Accordingly, the circuit is arranged so that one part of the feedback loop (formed by the comparator 48 etc.) is arranged to bias the TIA input stage 42 so the mid level of $V_{TIA}(t)$ is substantially equal to $V_{REF}$ which corresponds to the logic-mid level of the reference signal, whereas the other part of the feedback loop (formed by the comparator 46 etc.) is arranged to set the modulation amplitude of the reference signal equal to that of $V_{TIA}(t)$.

Figure 5A:
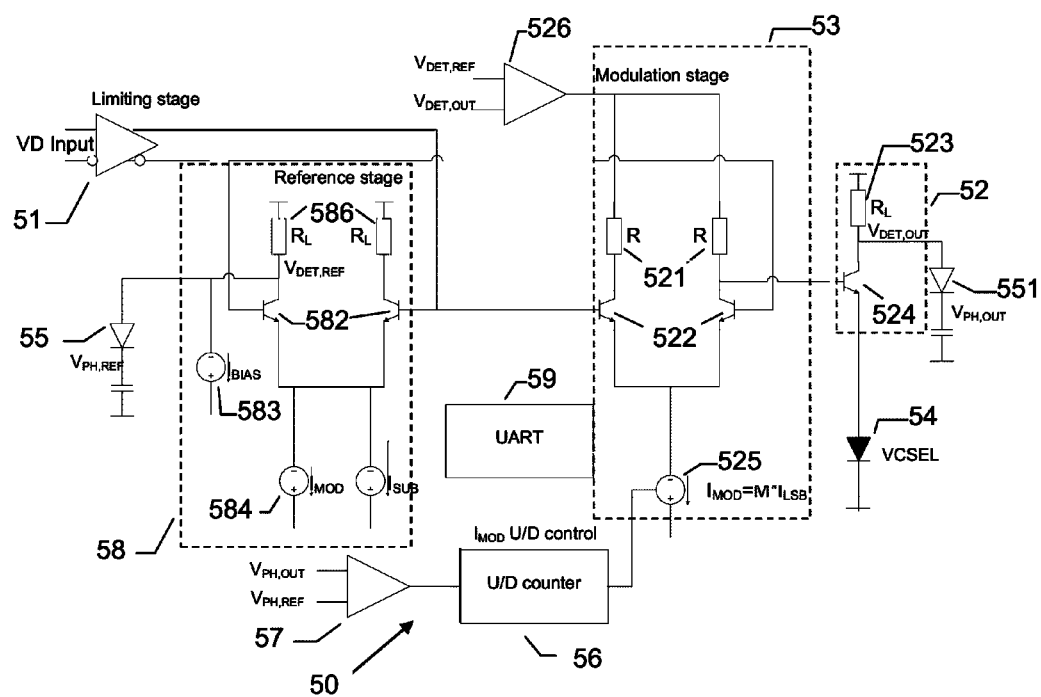
FIG. 5a Shows an exemplary circuit for an optical transmitter according to one embodiment of the invention.

FIG. 5a shows the invention implemented into a driver circuit. In this case a VCSEL driver circuit. In one embodiment the circuit is modified to drive other types of laser diodes and similar types of light sources.

The output stage 52 of the VCSEL driver 5 shown here is not similar to output stages traditionally used in VCSEL drivers. The output stage 52 differs in that the output is substantially a voltage driven output rather than a current driven output. The goal of the VCSEL driver is to generate a drive waveform which causes the VCSEL to output a suitable optical signal. The light output of a VCSEL depends substantially on the current provided to the VCSEL, so the aim of VCSEL driver is to provide a current drive waveform. A voltage driven output may therefore seem an odd choice as non-linearity in the VCSEL and/or coupling to the VCSEL may provide a non-linear or unpredictable relationship between the output voltage and output current. However, the low impedance this output presents to the VCSEL has benefits in terms of better matching and thereby less ringing on the interface. Another advantage of this output stage is that it uses a NPN transistor to anode drive the VCSEL, thereby enabling high data rates.

Since the output driver is really a voltage driver, the VCSEL bias and modulation currents are not simply set by current sources which is often the case in VCSEL driver circuits. In this implementation the VCSEL bias and modulation current is monitored and regulated to control the current output waveform. FIG. 5a shows a diagram of the output stage with the control loops used to set the VCSEL bias and modulation currents.

The input to the VCSEL driver at the limiting amplifier 51 is first driven into limiting to ensure that the switch pairs 582, 522 inside the output stage are fully switched. The limited signal is then used to drive the reference stage 58 and the driver stage formed by the modulation stage 53 and the output stage 52. In the reference stage 58 a reference bias and modulation current is set by DC current sources 583 and 584, respectively. At the node 586 the reference stage then produces a corresponding output voltage ($V_{DET,REF}$) that tracks the incoming data. The bias and modulation amplitude of this signal is the amplitudes that the intended VCSEL current would produce over the resistor 581 of magnitude $R_L$. In the present embodiment a single peak detector 55 is arranged to detect a peak measure $V_{PH,REF}$ from $V_{DET,REF}$ providing a measure $V_{PH,REF}$ in this case of the logic-high level. However, the logic-low level may be detected instead or both logic-high and logic-low may be detected similar to the receivers of FIGS. 2 and 4.

At the collector of the output transistor 524 is placed a resistor 523 of substantially same magnitude $R_L$ through which the current to the VCSEL 54 is conducted through. From the VCSEL current in this resistor a first binary signal ($V_{DET,OUT}$) is produced, that is a voltage representative of the VCSEL modulation and bias current. The peak measure $V_{PH,OUT}$ of $V_{DET,OUT}$ is detected by a peak detector 551 corresponding to the peak detector 55 of the reference stage 58. This voltage signal ($V_{DET,OUT}$) is compared with the ($V_{DET,REF}$) in the reference block.

The voltage amplitude in the modulation stage 53 sets the VCSEL modulation current substantially through the VCSEL impedance and the impedance of the coupling to the VCSEL such as bond wires. The VCSEL modulation current is therefore adjusted by changing the voltage swing of the modulation stage. Similarly to the receivers of FIGS. 2 and 4, a control loop is provided as a comparator 57 which compares the voltages from the peak detectors, and the comparator output is fed to a clocked UP/down counter 56 which adjust the current source 525 which in turn controls the voltage swing also referred to a modulation amplitude of $V_{DET,OUT}$. In this embodiment the modulation control loop is implemented as a digital control loop which gives the possibility of disabling the loop in case of no data present, gives flexibility in regulation speed and ensures stability if the regulation clock can be made slow enough. Analog implementations are also possible.

The VCSEL bias current is set by controlling the logic-high VCSEL voltage. The logic-high VCSEL voltage is set by the common mode voltage of the modulation stage which in this embodiment is adjusted by a voltage regulator 526, implemented as a PMOS connected to the supply. The input of the voltage regulator 526 is the voltage signals $V_{DET,OUT}$ and $V_{DET,REF}$ from the output stage 52 and the reference stage 58, respectively. The voltage regulator 526 is arranged so that its frequency response is slow relative to the data rate, so that the regulator 526 effectively compare the average values of $V_{DET,OUT}$ and $V_{DET,REF}$. The voltage regulator then functions to equalize the average of the two input signals by adjusting the common mode voltage of the modulation stage 53. In this embodiment the bias current control loop is implemented as an analog loop, since this loop is preferably fast to improve PSRR (Power Supply Rejection Ratio), and the dynamic range is quite large due to supply and VCSEL variations which may require a large chip area if implemented as a digital circuit.

It is noteworthy that in the event the signal is not balanced the average value will be different from the mid-logic level between the logic-high and logic 0. However, as the signal content is the same for $V_{DET,OUT}$ and $V_{DET,REF}$ the average value may in one embodiment still be useful for regulating so that $V_{DET,OUT}$ provides substantially the same bias current as applied in the reference stage. The accuracy of the peak detectors may be influenced by the signal content but this influence is shared between the detectors 55 and 551 so that $V_{PH,REF}$ and $V_{PH,OUT}$ are still useful for regulating so that $V_{DET,OUT}$ provides substantially the same modulation current as applied in the reference stage. In one embodiment, the embodiment of FIG. 5a is implemented with a comparison of measures of the logic-high level and the logic-low level in instead of a comparison of the average value in combination with a measure of the logic-high (or logic-low) value as in the embodiment of FIG. 5a. Similarly, the embodiments of FIGS. 2 and/or 4 may be implemented with the measures used in the embodiment of FIG. 5a. It may in principle also be possible to apply other measures to compare the reference signal with the first binary signal as long as these are representative of the bias and/or modulation amplitude of the first binary signal.

Figure 5B:
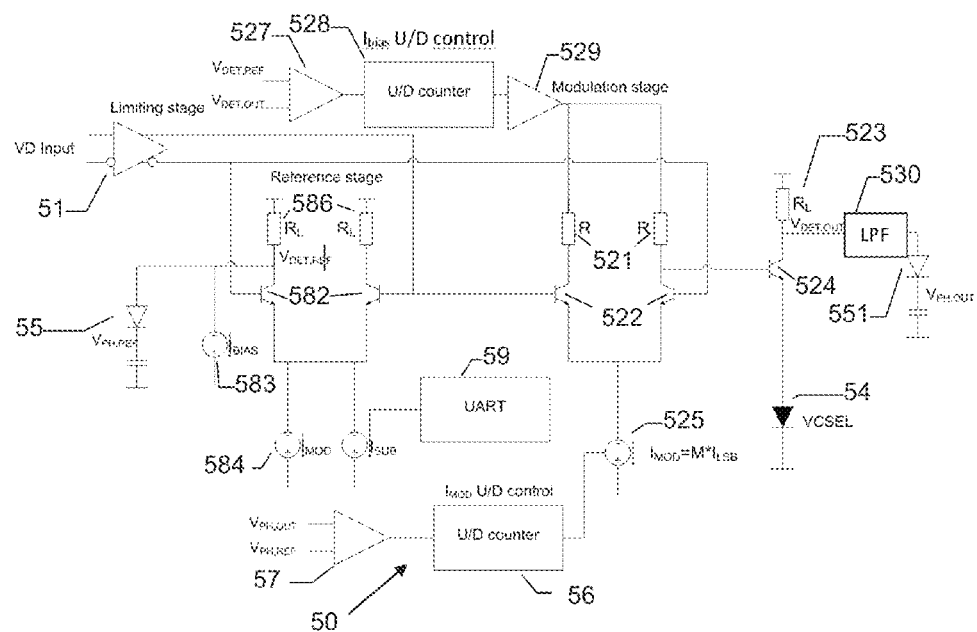

FIG. 5b shows an implementation of two exemplary variations of the circuit of FIG. 5a. These may be implemented separately or together as shown. In FIG. 5a the voltage regulator 526 is implemented as an analog feedback loop. As the first variation in FIG. 5b the regulator is digital similar to the loop controlling the modulation current source 525. The comparator 527 provides an input to the up/down counter 528 which in turn provides the common mode voltage of the reference stage via the amplifier 529. As a second variation, a low-pass filter 530 is provided at the input of the peak detector 551. In one embodiment this filter is arranged to eliminate spikes and/or high frequency ringing which may arise from the light source and/or transmission lines connecting the light source to the circuit. For example, VCSELs driven with a binary signal may be prone to ringing or spiking particularly when the signal is at a high bit rate relative to the bandwidth of the VCSEL. In one embodiment such spikes and/or ringing affects the measured peak measure by the peak detector 551 whereas corresponding spiking/ringing is not present at the input of the reference peak detector 55 causing an error between the first-peak-measure from the detector 551 and the reference peak measure from 55; however, by inserting a filter 530 such spikes may be reduced or eliminated. The filter is preferably tunable so that its response may be adapted to the behavior of the lights source and/or transmission line. In one embodiment the settings of the filter are determined as part of initialization of the combined driver and light source, such as part of a test procedure during production of transmitter. In one embodiment production variation of the light sources and/or transmission lines are sufficiently small that it is sufficient to determine the setting the filter for each type or maybe for each batch of light source.

Figure 5C:
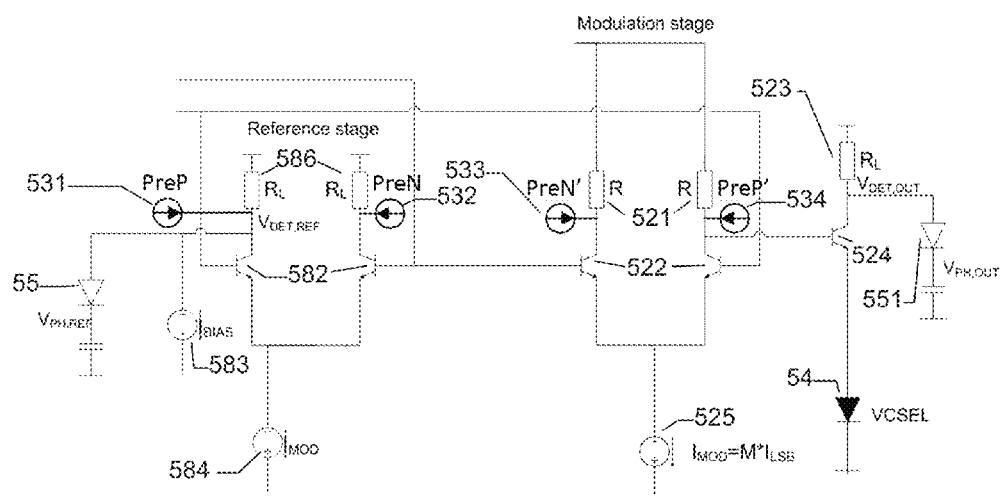
FIG. 5c shows a variation of the exemplary circuit of FIG. 5a and/or 5b.
Figure 6A:
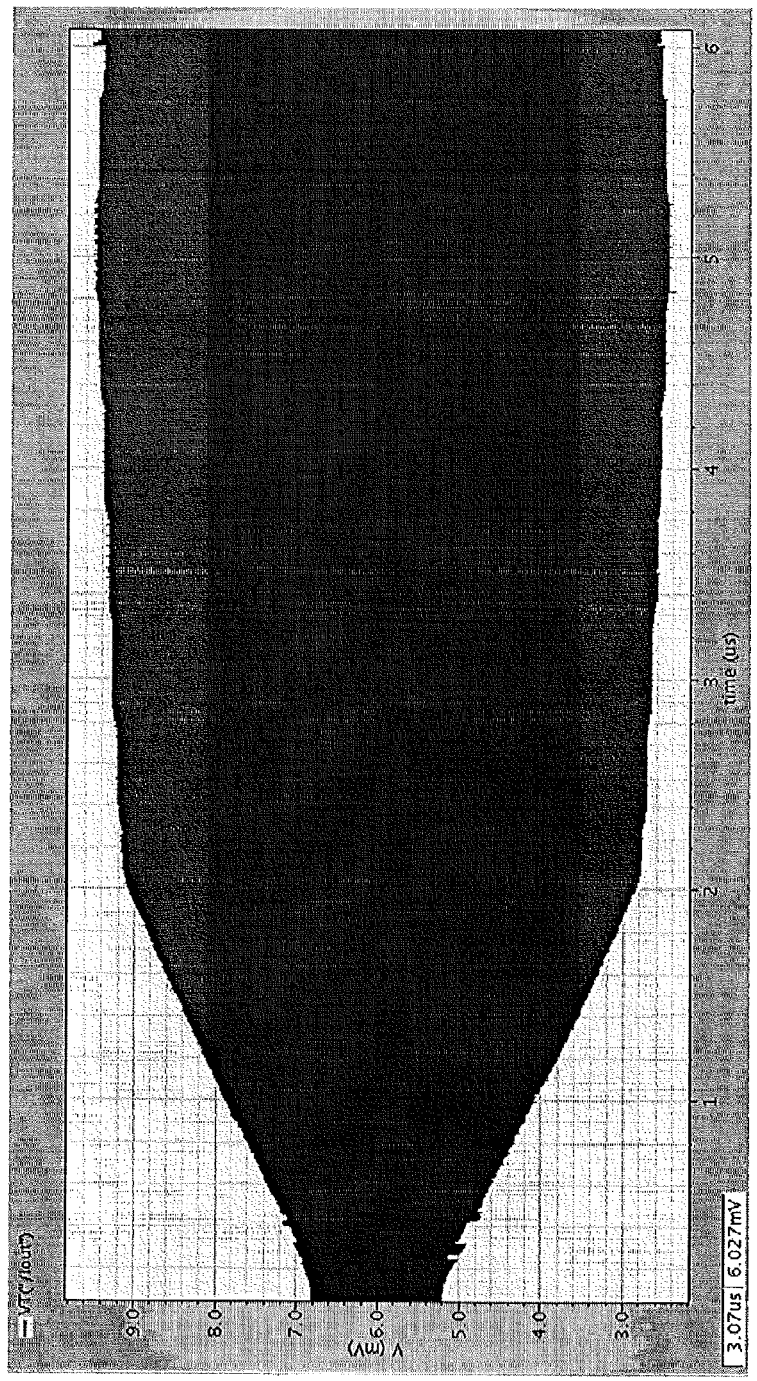
FIG. 6a Shows the VCSEL drive current from a simulated start up of the transmitter of FIG. 5. The signal is a dotting sequence.
Figure 6B:
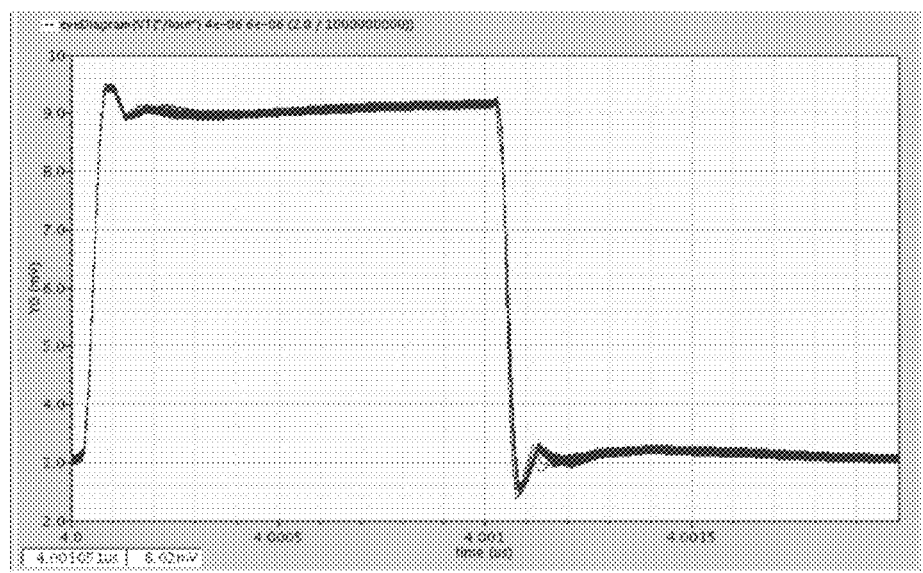
Figure 6C:
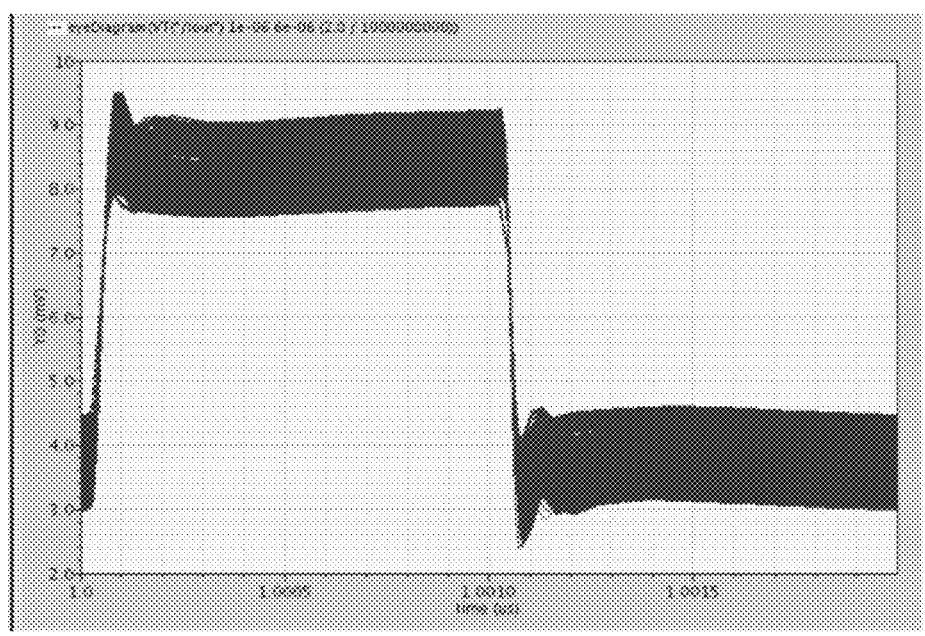
Figure 6D:
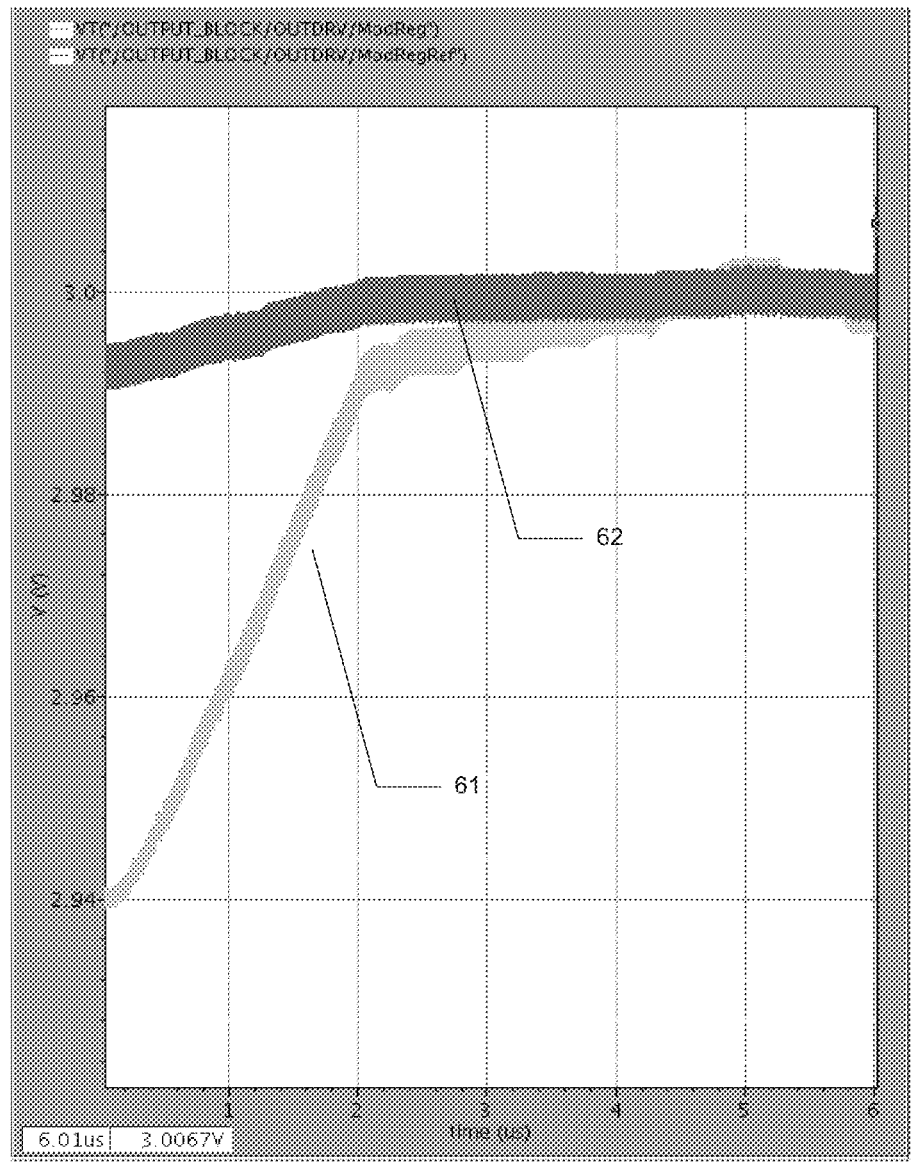
FIG. 6d Shows the output from the peak detectors 55 and 551.
Figure 6E:
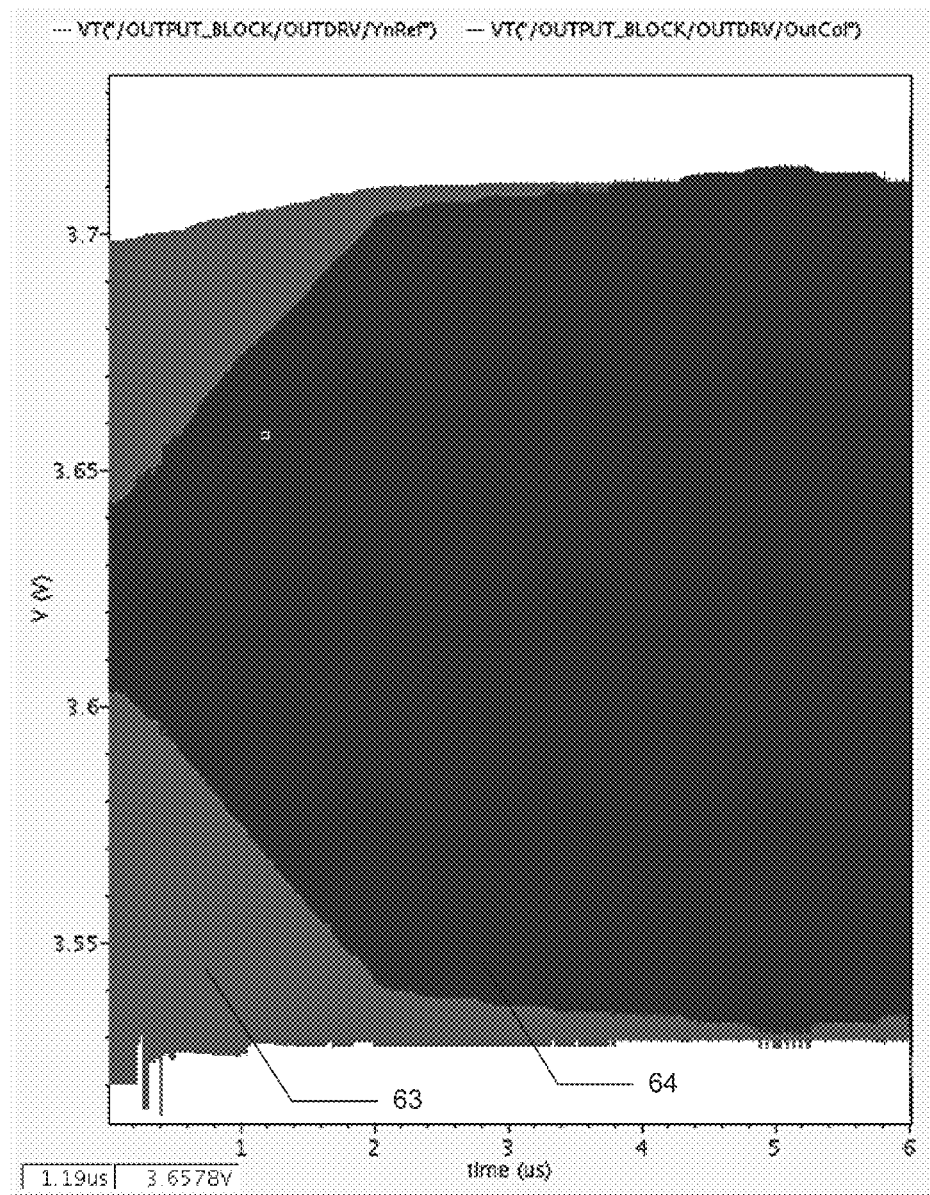
FIG. 6e Shows the input to the voltage regulator 526.
Figure 6F:
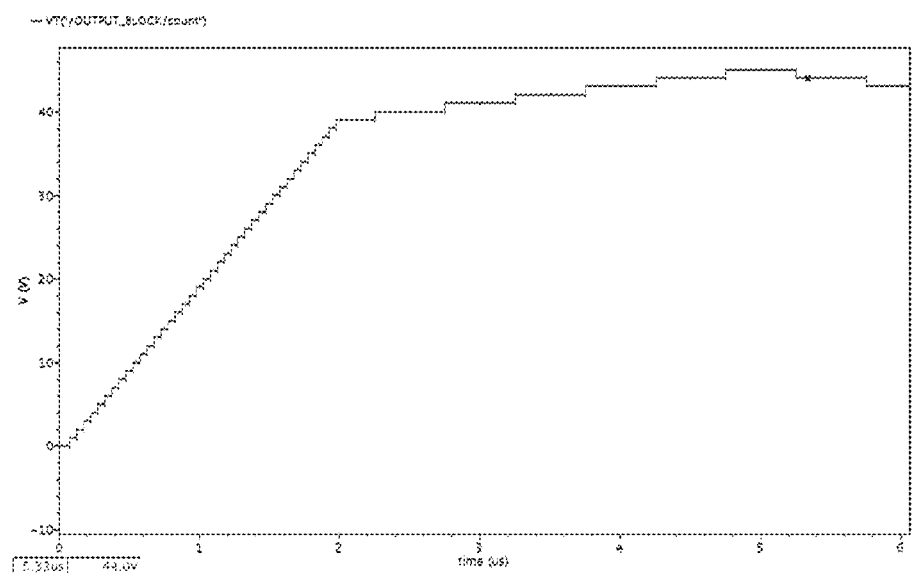
FIG. 6f Shows the up/down counter value of the U/D counter 56.

FIG. 5c shows another variation of the circuit of FIG. 5a which may be implemented separately or together with other variations. Only the relevant subsections of the circuit are shown. The remaining circuit is as in FIG. 5a. Pre-emphasis, charge injection and/or charge extraction are sometimes applied when driving light sources such as laser diodes such as VCSELs. An additional current pulse (also referred to as pre-emphasis signal) is supplied to the drive stage during at least part of the transition from logic-high to logic-low and/or from logic-low to logic-high to inject or extract current from the light source. Pre-emphasis may result in a peak in the drive waveform depending on the particulars such as the duration and magnitude of the pre-emphasis signal, the light source and/or the impedance of the output stage and transmission lines. In the circuit of FIG. 5c the sources of the pre-emphasis signal are indicated as current sources 531-534. The current source 534 provides the pre-emphasis signal PreP' to the base of transistor 524 which drives the light source 54. The optional current source 533 provides the inverted signal PreN' to the other side of the modulation stage thus stabilizing the current drawn by the stage. The pre-emphasis will likely affect the peak measure obtained by the peak detector 551. In one embodiment this effect is reduced or removed by introducing a LPF 530 similarly to FIG. 5b. In one embodiment a corresponding pre-emphasis signal is applied to the reference stage so that reference peak measure is subjected to substantially the same signal as the light source. In FIG. 5c the corresponding pre-emphasis signal is provided by the current sources 532 and 531 which provides PreP and PreN. FIG. 6a-f shows simulated signals from start-up of the driver circuit of FIG. 5a. The clock to the up/down counter runs at 20 MHz for the first 2 us, and thereafter runs at 2 MHz. In this embodiment the U/D counter is constructed so that the up/down counter always count either up or down for each clock edge, so the amplitude is constantly modulating slightly. To speed up the simulation the simulated signal applied is a dotting sequence. FIG. 6a shows the signal $V_{DET,OUT}$ which is substantially proportional to the current driven to the VCSEL. The bias current (set by the current source 583) and the modulation amplitude (set by the current source 584) of the reference stage 58 functions as target values which the feedback loops discussed above adapts the output signal $V_{DET,OUT}$ to. This effect is clearly seen in FIG. 6e. FIG. 6e shows the input to the voltage regulator 526, i.e. the signal $V_{DET,OUT}$ shown as curve 64 and the signal $V_{DET,REF}$ shown as curve 63. The two curves are shown as a band due to the high data rate of the signal not resolved in the graf. FIG. 6c shows a superposition of the signal shown in FIGS. 6a and 6e from 1 µs to 6 µs whereas FIG. 6b shows the superposition from 4 µs to 6 µs. In FIG. 6d the output from the peak detector 55, i.e. $V_{PH,REF}$, is shown as the curve 61, and the output from the peak detector 551, i.e. $V_{PH,DET}$, is shown as the curve 62. Finally, FIG. 6f shows the development of the up/down counter value of the U/D counter 56 as the modulation current source 525 is increased to match the reference stage.

As noted above, one application of an embodiment of the invention is in the transmission and reception of a link data stream modulated onto the signal carrying the payload data. The link data stream could in principle carry any data but one use is to carry configuration data of the optical link between the receiver and transmitter. The link data stream is also referred to as sub band information in the following as the data rate of the link data transmitted e.g. by modulating the modulation current will most likely be lower than that of the payload data (i.e. the normal binary signal) which could be at e.g. 10 Gbit/s or 25 Gbit/s.

The following is a design example of an optical link where the transmission and reception of sub band information is discussed. The transmitter is based on the driver circuit of FIG. 5a and the receiver design of FIG. 4. The system is designed to have a data rate of the payload data at 25 Gbit/s.
Link Budgets and Design Targets The link consists of a VCSEL driver (FIG. 5a), coupling from the VCSEL to a fiber, 1-2 interconnections, coupling from fiber to Photo Diode.

For 10 Gb/s systems the maximum average optical power (AOP) out of a typical VCSEL designed for 10 Gbit/s is 4.9 dBm and the minimum optical modulation amplitude OMA is –0.8 dBm. For this example we will assume the same numbers for a VCSEL having sufficient bandwidth to 25 Gbit/s. The extinction ratio (ER) may vary from a high level of approximately 6 dB down to 3 dB. Designing for ER ratios larger than 6 dB is difficult because it is important to avoid turn off of the VCSEL for low levels, whereas 3 dB is assumed to be the minimum useful value.

The following table show the numbers of the link budget:

TABLE 1

Link budget

| Symbol | Characteristic | Min | Max | Unit |
|---|---|---|---|---|
| $AOP_{Max}$ | Maximum Average optical power of VCSEL | | 4.9 | dBm |
| $OMA_{MIN}$ | Minimum optical modulation amplitude | –0.8 | | dBm |
| ER | ER | 3 | 6 | dB |
| | Connector loss from VCSEL to fiber | 0.5 | 2.5 | dB |
| | Interconnection coupling loss | 0.1 | 1.5 | dB |
| | Connector loss from fiber to photo diode | 0.1 | 1 | dB |
| $AOP_{Rec}$ | Received worst case AOP | –4.0 | 4.2 | dBm |
| $OMA_{Rec}$ | Received worst case OMA | –5.8 | 5 | dBm |

From Table 1 it is seen that the minimum OMA is –5.8 dBm corresponding to 0.26 mW. Assuming a responsivity of 0.4 in a worst case scenario this means that the minimum input photo current amplitude is 104 µA.

Because the eye out of the VCSEL is not always fully open, it is necessary to have some further tolerance in sensitivity. Therefore an input sensitivity $I_S$ of 50 µA has been chosen as a target for the receiver also referred to as TIA in the following.

Similarly, the maximum AOP is 4.2 dBm corresponding to 2.6 mW. Assuming a responsivity of 0.6 W/A in a worst case scenario this corresponds to 1.56 mA. Maximum OMA is 3.15 mW corresponding to 1.9 mA.

In the present example control of parameters of the optical link is possible via feedback through the sub band information. Therefore it is expected that it is possible to obtain a larger minimum OMA than specified above. This should be possible because it is not necessary to have a large tolerance for poor adjustment of the VCSEL driver settings which is often necessary in open loop systems. Also the maximum input levels can in one embodiment be relaxed because of the control in the system, as the system may reduce the optical power if it is above a set maximum level or if the signal quality is sufficient.
Design Targets:

A main design target for the receiver is the input referred rms noise. In order to achieve a sufficient link budget allowing for coupling losses and VCSEL power variations BER must be below $10^{-12}$ (corresponding to a Q value of 7). From the above the input referred noise requirement is found to:

Total input referred noise $I_N=I_S/(2*Q)=50$ µA/14=3.57 µA.

As found above the maximum average input current is 1.56 mA and the maximum input current amplitude is 1.9 mA.

The output voltage swing is chosen to 2×200 mV for this application.

The output of the TIA must be limiting for minimum input levels. This sets the minimum transimpedance gain to 2×200 mV/50 µA=8 kΩ.

Several options are available to modulate the transmitted signal with sub band information. In one embodiment the center value between logic-low and logic-high are modulated, e.g. by modulating the bias current for example by modulating the current source 583 in the transmitter of FIG. 5a. It may also be possible to modulate both the bias and modulation amplitude. This may have the advantage that the receiver may be less sensitive to noise as modulation of only one of the parameters may be rejected. In one such embodiment this is implemented so that one logic level is constant while the other is modulated. In one embodiment the receiver rejects modulation which does not affect the extinction ratio of the received signal because such a change may be indicative in a change in the optical loss (e.g. from alteration of an optical fiber) rather than a modulation.
Detecting Sub Band Information:

In the present embodiment the sub band information is modulated onto the VCSEL by modulating the modulation amplitude current for the VCSEL while keeping the logic-mid level of the signal constant. Since the VCSEL modulation current is generated as a sum of reference currents similar to the current source generation shown in FIG. 3 and the step size could in one embodiment be 200 µA for a maximum of 8 mA modulation current the minimum sub band modulation index would be 1/(8 mA/200 µA)=2.5%. If the modulation current is less than e.g. 4 mA the minimum modulation index will be 5%.

Assuming in this example a modulation index of approximately 5%, this means that the receiver must be able to demodulate with sufficient accuracy this amount. In the discussion surrounding FIG. 3 above the resolution of the combined current source of e.g. a current source according to FIG. 3 was approximately 1%. In the present example such a current source is implemented as the adjustable current sources 455 and 456 of the reference stage of FIG. 4. With an accuracy of 1% the U/D information from the control loops may be applied to determine whether the received modulation amplitude changes with the required resolution of 5%.

Even when the loops of the receiver of FIG. 4 have settled random fluctuations may provide that control loop occasionally has an up count or down count. However, if e.g. 5 consecutive down counts are counted then this could in one embodiment be used to indicate that the modulation current has been e.g. reduced by 5% which in turn could be applied to signal a bit in the sub band information. Alternatively, the modulation of the value of the adjustable current source may be applied.

Figure 7:
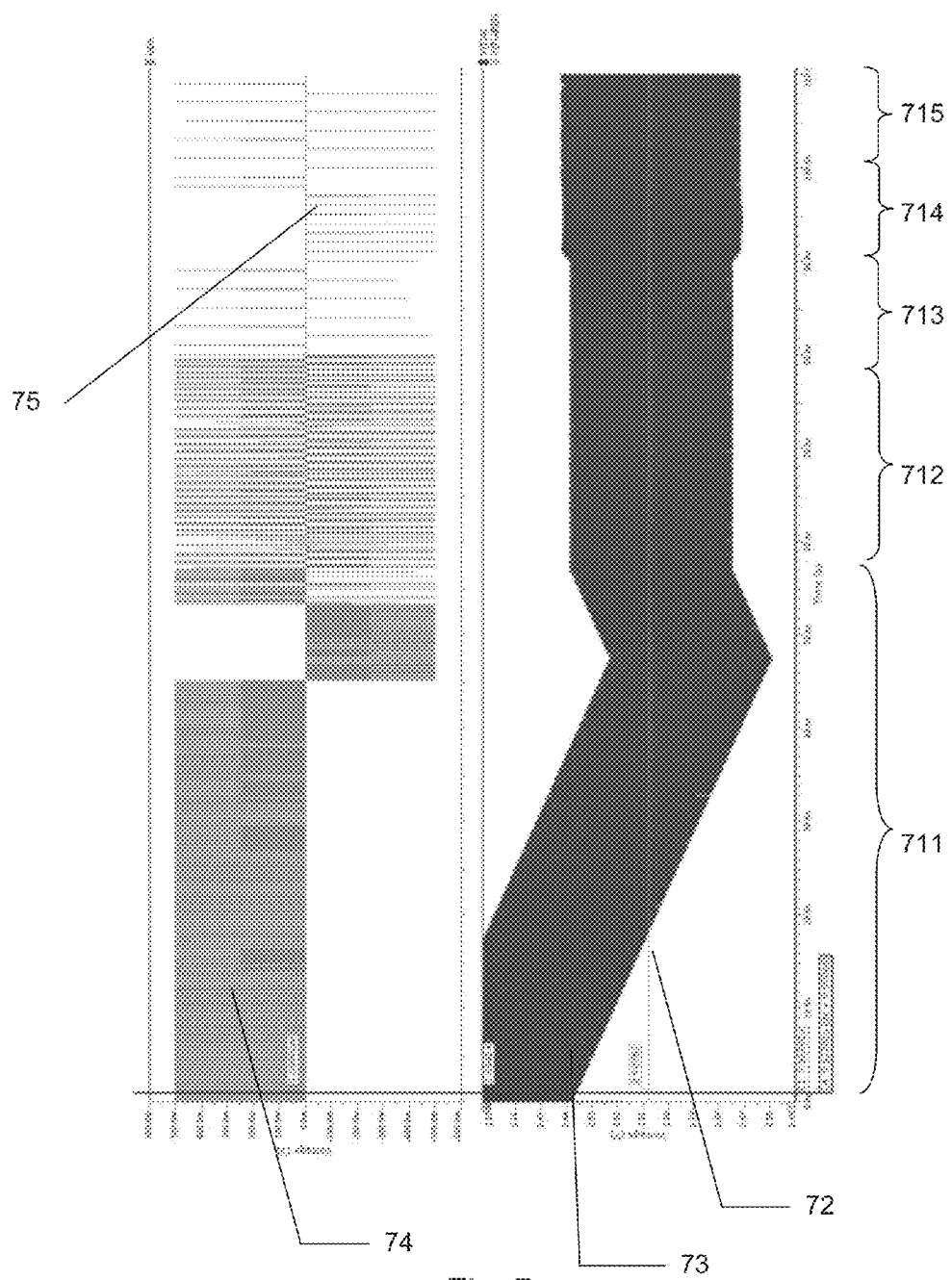
FIG. 7 Shows the result of a simulation where the receiver of FIG. 4 receives an optical signal and how the feedback loop positions the output from the TIA input stage relative to the reference voltage of the limiting amplifier. Furthermore the action of the U/D counter adjustning the modulation current of the reference stage is shown.

FIG. 7 shows the result of a simulation where the receiver of FIG. 4 receives an optical signal. The output of the TIA input stage 73 is shown as a wide band due to the high data rate of the optical signal. During the period 711 the signal settles symmetrically around the reference voltage $V_{REF}$ 72 input to the limiting amplifier 24 due to the action of the feedback loops formed by the comparators 48, 49 and the U/D counters 46, 47 and the current sources 411, 455 and 456 discussed above. Here the activity of the U/D counter 46 is shown in the curve 74. It is noted that the high activity is observed during settling of the signal through the period 711 and the signal finally appears to be settled in the period 712 because this period exhibits substantial equal amounts of an up and down counts. After the period 712 the clock signal to the U/D counters is reduced. To simulate the transmission of 1 bit in the sub band information the modulation amplitude of the received optical signal is increased by 10% at the beginning of the period 714. In response to this increase the U/D counter adjust the modulation current by series of (7) counts (the sign is artificial) after which the signal is again stabilized with sporadic up and down counts in the period 615. This illustrates how sub band information may be received.

Synchronization Between the Transmitter and the Receiver:

In one embodiment the receiver is synchronized with the transmitter in order to demodulate the information. This may be done by making the transmission system similar to a UART where a pre-ample is transmitted before the payload. In the receiver the sampling time is estimated based on the pre-ample by using oversampling. For example, the clock used for transmission of the sub band information could be 5 MHz clock source. A signal bit rate of 1 kHz can then be transmitted and received with a 500× oversampling. If the transmit clock and receive clock are mismatched by e.g. 20% then the oversampling technique and pre-ample will in one embodiment ensure that data is correctly received.

The length of the maximum data payload can with the above be estimated by the following:

Assume for example that the clock mismatch between the receiver and the transmitter is 20% at maximum and that the U/D control system in the receiver is clocked by a sub frequency of e.g. with 100 kHz from a 5 MHz clock of the receiver. Therefore a change of the modulation current by 5% stepped in 1% at a rate of 100 kHz is carried out in 50 μs. The accuracy of this transition is within the same range—e.g. 30 μs. This accuracy may be increased if several pulses are transmitted for the pre-ample because averaging in that case can be used. If the transmission speed is 1 kHz then one bit period is 1 ms. Therefore a maximum of 1 m/30μ=33 bits can be transmitted before re-synchronization is needed.

In one embodiment the transmitted data is encoded, such with 8b10b encoding. In such cases it is possible to use transitions in the payload to resynchronize. But that also adds complexity to both the transmitter and the receiver. It may therefore be preferable to just transmit the raw payload of the sub band information. In one embodiment an error detection is implemented. A simple example of such error detection is simply to retransmit the same information twice and then answer back with acknowledge if the two messages are identical.

Several alternatives exist as alternative to the UART type transmission described above. For example in one embodiment the sub band information is simplified to as message of "Up" or "Down" to indicate Up in power or Down in transmitted power then transmitting e.g. UP may be done by transmitting a 101010 sequence and Down 111000111000111 in which case any clock mismatch between the transmitter and the receiver is negligible.

Modulating sub band information:

In the driver circuit of FIG. 5a an additional modulation current source 585 in the reference stage is illustrated. The current source is connected to an element 59 which provide the modulation of the sub band information. In principle the current source 584 may be modulated directly. Alternatively, the bias may be modulated via an additional current source (not shown) or by modulating the source 583. In the case where the logic-mid level of the signal is constant and the modulation amplitude is modulated the bias current and the modulation current of the reference must be modulated, similarly to the reference stage of FIG. 4. In FIG. 5a this means that the current source 583 is modulated along with the current source 585.

In either case, as the reference stage is modulated the feedback loops of the driver will function so that the $V_{DET,ouT}$ and hence the drive current will follow and the optical signal will therefore be modulated.

As will be apparent to the skilled person there are many ways within the scope of the invention in which the invention may be implemented in general and in the transmission and/or reception of sub band information. This scope is exemplified by the attached set of claims.

The invention claimed is:

1. A method of determining a signal property of a first binary signal in a circuit for an optical transmitter, receiver or transceiver comprising:
   a. providing a first binary signal, having a logic-low level and a logic-high level, said binary signal modulated by a signal content,
   b. providing a reference binary signal by modulating a reference stage, having a reference logic-low level and a reference logic-high level, said reference signal modulated by said signal content by
      i. modulating said reference stage with said first binary signal or substantially a copy thereof, or
      ii. providing a second binary signal being a substantially limited copy of said first signal and applying said second binary signal in modulating said reference stage,
   c. providing at least one first-peak-measure of one of said logic levels of said first binary signal,
   d. providing at least one reference-peak-measure of the corresponding logic levels of said reference binary signal, and
   e. comparing said first-peak-measure and said reference-peak-measure to obtain a measure of said signal property, said signal property being the modulation amplitude of said first binary signal.

2. The method of any of the preceding claims claim 1 wherein one or more of said reference logic-low level and said logic-low level is adjustable.

3. The method of claim 2 wherein the method further comprises applying said comparing as an error signal in a feedback loop arranged to adjust one or more of said reference logic-low level and said first logic-low level so that said first peak measure and a corresponding reference-peak-measure are substantially equal.

4. The method of claim 1 wherein one or more of said reference logic-high level and said logic-high level is adjustable.

5. The method of claim 4 wherein the method further comprises applying said comparing as an error signal in a feedback loop arranged to adjust one or more of said reference logic-high level and said first logic-high level so that said first peak measure and a corresponding reference-peak-measure are substantially equal.

6. The method of claim 1 further comprising obtaining a measure of the average of the first binary signal, obtaining a measure of the average of the reference binary signal and comparing said averages to determine an error signal, and applying said error signal in a feedback loop arranged to adjust one or more of the average of the first binary signal and the average of the reference binary signal.

7. The method of claim 1 further comprising providing said second binary signal is the output from a limiting amplifier having said first binary signal as an input and a reference voltage $V_{REF}$ as input.

8. The method of claim 1 further comprising providing said first binary signal as a function of a received photo current in an optical receiver said function comprising applying a transimpedance amplifier (TIA).

9. The method of claim 8 further comprising demodulating said error signal to extract a data signal modulated onto the modulation amplitude of said received photo current.

10. The method of claim 1 further comprising providing said first binary signal as a function of a current drive output of a driver stage for a light source.

11. The method of claim 10 wherein said driver stage comprises an output stage comprising an emitter follower comprising a transistor having emitter, collector and base connections said driver stage being arranged to allow a light source to be connected to said emitter connector.

12. The method of claim 11 further comprising applying one or more feedback loops to adjust one or more of the logic levels of the first signal binary signal to be substantially equal to the corresponding logic level of said reference binary signal.

13. The method of claim 10 further comprising modulating one or more of the modulation amplitude, logic-mid level, first logic-low level and first logic-high level of said first binary signal with a link data stream.

14. The method of claim 13 wherein said modulating the modulation amplitude comprises modulating one or more of said reference logic-low level and said reference logic-high level.

15. The method of claim 13 wherein said modulating the modulation amplitude comprises modulating one or more of a bias current source and a modulation current source of the reference stage.

16. The method of claim 13 comprising calibrating adjustment of a current source in the driver stage with change in the first binary signal.

17. The method of claim 1 further comprising implementing said method into a circuit suitable for operating with a first binary signal having a bit rate higher than or equal to 10 Gbit/s.

18. An optical receiver/driver circuit for processing a binary signal modulated by a signal content comprising:
  a. circuitry for providing a first binary signal having a logic-low level and a logic-high level and modulated by said signal content,
  b. a reference stage providing a reference binary signal, having a reference logic-low level and a reference logic-high level, modulated by said signal content,
    i. a first peak detector arranged to provide at least one first-peak-measure of one of said logic levels of said first binary signal,
    ii. A reference peak detector providing at least one reference-peak-measure of the corresponding logic levels of said reference binary signal,
  c. circuitry arranged to compare said first-peak-measure and reference-peak-measure and thereby obtain a measure of a signal property of said first binary signal.

19. An optical transmitter or transceiver comprising a driver circuit according to claim 18 connected to semiconductor laser.

20. An optical receiver or transceiver comprising a receiver circuit according to claim 18 connected to a photo detector, such as a photo diode.

* * * * *